United States Patent
Yang et al.

(10) Patent No.: US 11,950,273 B2
(45) Date of Patent: **\*Apr. 2, 2024**

(54) PREEMPTION INDICATION AND PERMISSION INDICATION MANAGEMENT FOR MOBILE BROADBAND AND LOW LATENCY COMMUNICATION MULTIPLEXING

(71) Applicant: QUALCOMM Incorporated, San Diego, CA (US)

(72) Inventors: Wei Yang, San Diego, CA (US); Jing Jiang, San Diego, CA (US); Chih-Ping Li, San Diego, CA (US); Seyedkianoush Hosseini, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,765

(22) Filed: Feb. 27, 2023

(65) Prior Publication Data

US 2023/0224947 A1     Jul. 13, 2023

Related U.S. Application Data

(63) Continuation of application No. 16/582,944, filed on Sep. 25, 2019, now Pat. No. 11,606,799.

(Continued)

(51) Int. Cl.
*H04W 72/542*     (2023.01)
*H04L 5/00*     (2006.01)
(Continued)

(52) U.S. Cl.
CPC ......... *H04W 72/542* (2023.01); *H04L 5/0053* (2013.01); *H04W 72/0446* (2013.01);
(Continued)

(58) Field of Classification Search
CPC ........... H04W 72/085; H04W 72/0446; H04W 72/042; H04W 72/14; H04W 72/1242; H04L 5/0053; H04L 5/0007; H04L 5/0094

See application file for complete search history.

(56) References Cited

U.S. PATENT DOCUMENTS 9,750,048 B2    8/2017    Damnjanovic et al.
2017/0013641 A1    1/2017    Patel et al.
(Continued)

FOREIGN PATENT DOCUMENTS

KR     20180055714 A     5/2018
WO     WO-2016069152     5/2016

OTHER PUBLICATIONS

Fujitsu: "On UL Multiplexing of Transmissions with Different Reliability Requirements", 3GPP Draft; R1-1803944 EMBB and URLLC UL Multiplexing, 3rd Generation Partnership Project (3GPP), Mobile Competence Centre; 650, Route Des Lucioles; F-06921 Sophia-Antipolis Cedex; France, vol. RAN WG1, No. Sanya. China; Apr. 16, 2018-Apr. 20, 2018 Apr. 15, 2018, XP051426234, 5 pages.

(Continued)

*Primary Examiner* — Sharmin Chowdhury
(74) *Attorney, Agent, or Firm* — Holland & Hart LLP/Qualcomm Incorporated

(57) ABSTRACT

Methods, systems, and devices for wireless communication are described. In one example, a base station may dynamically configure a user equipment (UE) to monitor or avoid monitoring for a preemption indication. Accordingly, the UE (Continued)

may have a lower chance of monitoring for a preemption indication when it is unlikely that an uplink or downlink transmission will be preempted. In another example, a base station may transmit a control message indicating whether future indications received from the base station are to be interpreted as preemption indications or permission indications. Accordingly, the base station may choose to use either preemption indications or permission indications (e.g., based on the probability of collisions between mobile broadband (MBB) and low latency transmissions) to facilitate MBB and low latency communication multiplexing with limited signaling.

28 Claims, 19 Drawing Sheets

Related U.S. Application Data

(60) Provisional application No. 62/736,925, filed on Sep. 26, 2018.

(51) Int. Cl.
*H04W 72/0446* (2023.01)
*H04W 72/1268* (2023.01)
*H04W 72/23* (2023.01)
*H04W 72/566* (2023.01)
*H04W 76/20* (2018.01)

(52) U.S. Cl.
CPC ....... *H04W 72/1268* (2013.01); *H04W 72/23* (2023.01); *H04W 72/566* (2023.01); *H04W 76/20* (2018.02)

(56) References Cited

U.S. PATENT DOCUMENTS

| | | |
|---|---|---|
| 2018/0278368 A1 | 9/2018 | Kim et al. |
| 2018/0367263 A1 | 12/2018 | Ying et al. |
| 2019/0052432 A1 | 2/2019 | Islam et al. |
| 2019/0349795 A1 | 11/2019 | Park et al. |
| 2020/0100257 A1 | 3/2020 | Yang et al. |
| 2020/0328866 A1 | 10/2020 | Du et al. |
| 2020/0351887 A1 | 11/2020 | Miao et al. |
| 2020/0396724 A1 | 12/2020 | Babaei et al. |
| 2021/0120578 A1 | 4/2021 | Katranaras et al. |
| 2021/0168783 A1 | 6/2021 | Islam et al. |
| 2021/0360651 A1 | 11/2021 | Li |

OTHER PUBLICATIONS

International Preliminary Report on Patentability—PCT/US2019/053290, The International Bureau of WIPO—Geneva, Switzerland, dated Apr. 8, 2021.
International Search Report and Written Opinion—PCT/US2019/053290—ISA/EPO—dated Dec. 17, 2019.

310 ▦ PDCCH

315 ▦ MBB Communications

320 ▨ Low Lateny Communications

300

PREEMPTION INDICATION AND PERMISSION INDICATION MANAGEMENT FOR MOBILE BROADBAND AND LOW LATENCY COMMUNICATION MULTIPLEXING

CROSS REFERENCE

The present application for patent is a Continuation of U.S. patent application Ser. No. 16/582,944 by YANG, et al., entitled "PREEMPTION INDICATION AND PERMISSION INDICATION MANAGEMENT FOR MOBILE BROADBAND AND LOW LATENCY COMMUNICATION MULTIPLEXING" filed Sep. 25, 2019, which claims the benefit of U.S. Provisional Patent Application No. 62/736,925 by YANG, et al., entitled "PREEMPTION INDICATION AND PERMISSION INDICATION MANAGEMENT FOR MOBILE BROADBAND AND LOW LATENCY COMMUNICATION MULTIPLEXING," filed Sep. 26, 2018, each of which is assigned to the assignee hereof and expressly incorporated by reference herein.

BACKGROUND

The following relates generally to wireless communications and more specifically to preemption indication and permission indication management for mobile broadband (MBB) and low latency communication multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support the multiplexing of different types of communications, such as MBB communications and low latency communications. In such systems, resources originally allocated for MBB communications may be reassigned (or punctured) for bursty, low latency communications. Conventional techniques for facilitating the multiplexing of MBB communications and low latency communications may be deficient.

SUMMARY

The described techniques relate to improved methods, systems, devices, and apparatuses that support preemption indication and permission indication management for mobile broadband (MBB) and low latency communication multiplexing. Generally, the described techniques provide for supporting MBB and low latency communication multiplexing with limited signaling while limiting power consumption at an MBB user equipment (UE). In one example, a base station may dynamically configure a UE to monitor or avoid monitoring for a preemption indication. Accordingly, the UE may have a lower chance of monitoring for a preemption indication when it is unlikely that an uplink or downlink transmission will be preempted. In another example, a base station may transmit a control message indicating whether future indications received from the base station are to be interpreted as preemption indications or permission indications. Accordingly, the base station may choose to use either preemption indications or permission indications (e.g., based on the probability of collisions between MBB and low latency transmissions) to facilitate MBB and low latency communication multiplexing with limited signaling.

A method for wireless communication at a UE is described. The method may include receiving a preemption monitoring indication in a grant in a first downlink control channel, where the grant is for an uplink or downlink transmission, and the preemption monitoring indication indicates whether the UE is to monitor a second downlink control channel for a preemption indication and determining, based on the preemption monitoring indication, whether to monitor the second downlink control channel for the preemption indication.

An apparatus for wireless communication at a UE is described. The apparatus may include a processor, memory in electronic communication with the processor, and instructions stored in the memory. The instructions may be executable by the processor to cause the apparatus to receive a preemption monitoring indication in a grant in a first downlink control channel, where the grant is for an uplink or downlink transmission, and the preemption monitoring indication indicates whether the UE is to monitor a second downlink control channel for a preemption indication and determine, based on the preemption monitoring indication, whether to monitor the second downlink control channel for the preemption indication.

Another apparatus for wireless communication at a UE is described. The apparatus may include means for receiving a preemption monitoring indication in a grant in a first downlink control channel, where the grant is for an uplink or downlink transmission, and the preemption monitoring indication indicates whether the UE is to monitor a second downlink control channel for a preemption indication and determining, based on the preemption monitoring indication, whether to monitor the second downlink control channel for the preemption indication.

A non-transitory computer-readable medium storing code for wireless communication at a UE is described. The code may include instructions executable by a processor to receive a preemption monitoring indication in a grant in a first downlink control channel, where the grant is for an uplink or downlink transmission, and the preemption monitoring indication indicates whether the UE is to monitor a second downlink control channel for a preemption indication and determine, based on the preemption monitoring indication, whether to monitor the second downlink control channel for the preemption indication.

Some examples of the method, apparatuses, and non-transitory computer-readable medium described herein may further include operations, features, means, or instructions for receiving radio resource control (RRC) signaling that configures the UE to monitor the first downlink control channel for the preemption monitoring indication. Some examples of the method, apparatuses, and non-transitory computer-readable medium described herein may further include operations, features, means, or instructions for monitoring the second downlink control channel for the preemption indication based on the preemption monitoring indication indicating that the UE is to monitor the second downlink control channel for the preemption indication, where the uplink or downlink transmission may be allowed to be preempted by another transmission.

Some examples of the method, apparatuses, and non-transitory computer-readable medium described herein may further include operations, features, means, or instructions for avoiding monitoring the second downlink control channel for the preemption indication based on the preemption monitoring indication indicating that the UE is not to monitor the second downlink control channel for the preemption indication, where the uplink or downlink transmission is not allowed to be preempted by another transmission. In some examples of the method, apparatuses, and non-transitory computer-readable medium described herein, the preemption monitoring indication may be based on channel conditions or traffic conditions, a priority associated with the uplink or downlink transmission, an amount of downlink control information (DCI) received by the UE and a decoding budget at the UE, or a combination thereof.

In some examples of the method, apparatuses, and non-transitory computer-readable medium described herein, the preemption monitoring indication includes a one-bit field in DCI received in the first downlink control channel. In some examples of the method, apparatuses, and non-transitory computer-readable medium described herein, the uplink or downlink transmission includes a MBB transmission and the other transmission includes a low latency transmission. In some examples of the method, apparatuses, and non-transitory computer-readable medium described herein, the grant includes a semi-persistent scheduling (SPS) grant scheduling a sequence of transmissions, and the preemption monitoring indication indicates whether the UE is to monitor the second downlink control channel for preemption indications for the sequence of transmissions.

A method for wireless communication at a base station is described. The method may include identifying an uplink transmission from a UE or a downlink transmission to the UE to be scheduled, determining whether to configure the UE to monitor for a preemption indication associated with the uplink or downlink transmission based on whether the uplink or downlink transmission is allowed to be preempted by another transmission, and transmitting a grant in a first downlink control channel, the grant being for the uplink or downlink transmission and including a preemption monitoring indication indicating whether the UE is to monitor a second downlink control channel for the preemption indication based on the determination.

An apparatus for wireless communication at a base station is described. The apparatus may include a processor, memory in electronic communication with the processor, and instructions stored in the memory. The instructions may be executable by the processor to cause the apparatus to identify an uplink transmission from a UE or a downlink transmission to the UE to be scheduled, determine whether to configure the UE to monitor for a preemption indication associated with the uplink or downlink transmission based on whether the uplink or downlink transmission is allowed to be preempted by another transmission, and transmit a grant in a first downlink control channel, the grant being for the uplink or downlink transmission and including a preemption monitoring indication indicating whether the UE is to monitor a second downlink control channel for the preemption indication based on the determination.

Another apparatus for wireless communication at a base station is described. The apparatus may include means for identifying an uplink transmission from a UE or a downlink transmission to the UE to be scheduled, determining whether to configure the UE to monitor for a preemption indication associated with the uplink or downlink transmission based on whether the uplink or downlink transmission is allowed to be preempted by another transmission, and transmitting a grant in a first downlink control channel, the grant being for the uplink or downlink transmission and including a preemption monitoring indication indicating whether the UE is to monitor a second downlink control channel for the preemption indication based on the determination.

A non-transitory computer-readable medium storing code for wireless communication at a base station is described. The code may include instructions executable by a processor to identify an uplink transmission from a UE or a downlink transmission to the UE to be scheduled, determine whether to configure the UE to monitor for a preemption indication associated with the uplink or downlink transmission based on whether the uplink or downlink transmission is allowed to be preempted by another transmission, and transmit a grant in a first downlink control channel, the grant being for the uplink or downlink transmission and including a preemption monitoring indication indicating whether the UE is to monitor a second downlink control channel for the preemption indication based on the determination.

Some examples of the method, apparatuses, and non-transitory computer-readable medium described herein may further include operations, features, means, or instructions for transmitting RRC signaling that configures the UE to monitor the first downlink control channel for the preemption monitoring indication. Some examples of the method, apparatuses, and non-transitory computer-readable medium described herein may further include operations, features, means, or instructions for identifying another transmission to be scheduled on resources allocated for the uplink or downlink transmission and transmitting the preemption indication in the second downlink control channel indicating that the uplink or downlink transmission is to be preempted for the other transmission based on the preemption monitoring indication indicating that the UE is to monitor the second downlink control channel for the preemption indication.

In some examples of the method, apparatuses, and non-transitory computer-readable medium described herein, determining whether to configure the UE to monitor for the preemption indication may include operations, features, means, or instructions for determining whether to configure the UE to monitor for the preemption indication based on channel conditions or traffic conditions, a priority associated with the uplink or downlink transmission, an amount of DCI transmitted to the UE and a decoding budget at the UE, or a combination thereof. In some examples of the method, apparatuses, and non-transitory computer-readable medium described herein, the preemption monitoring indication includes a one-bit field in DCI transmitted in the first downlink control channel.

In some examples of the method, apparatuses, and non-transitory computer-readable medium described herein, the uplink or downlink transmission includes a MBB transmission and the other transmission includes a low latency transmission. In some examples of the method, apparatuses, and non-transitory computer-readable medium described herein, the grant includes a SPS grant scheduling a sequence of transmissions, and the preemption monitoring indication indicates whether the UE is to monitor the second downlink control channel for preemption indications for the sequence of transmissions.

A method for wireless communication at a UE is described. The method may include receiving a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, receiving an uplink grant in a first downlink control channel for an uplink transmission on the carrier to the base station, monitoring for a preemption indication or a permission indication in a second downlink control channel based on the control message, and transmitting the uplink transmission on the carrier based on monitoring for the preemption indication or the permission indication.

An apparatus for wireless communication at a UE is described. The apparatus may include a processor, memory in electronic communication with the processor, and instructions stored in the memory. The instructions may be executable by the processor to cause the apparatus to receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, receive an uplink grant in a first downlink control channel for an uplink transmission on the carrier to the base station, monitor for a preemption indication or a permission indication in a second downlink control channel based on the control message, and transmit the uplink transmission on the carrier based on monitoring for the preemption indication or the permission indication.

Another apparatus for wireless communication at a UE is described. The apparatus may include means for receiving a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, receiving an uplink grant in a first downlink control channel for an uplink transmission on the carrier to the base station, monitoring for a preemption indication or a permission indication in a second downlink control channel based on the control message, and transmitting the uplink transmission on the carrier based on monitoring for the preemption indication or the permission indication.

A non-transitory computer-readable medium storing code for wireless communication at a UE is described. The code may include instructions executable by a processor to receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, receive an uplink grant in a first downlink control channel for an uplink transmission on the carrier to the base station, monitor for a preemption indication or a permission indication in a second downlink control channel based on the control message, and transmit the uplink transmission on the carrier based on monitoring for the preemption indication or the permission indication.

Some examples of the method, apparatuses, and non-transitory computer-readable medium described herein may further include operations, features, means, or instructions for determining that the control message indicates that the UE is to interpret future indications received from the base station and pertaining to the uplink transmissions on the carrier as preemption indications, receiving a preemption indication in accordance with the control message indicating that the uplink transmission is to be preempted by another transmission and dropping at least a portion of the uplink transmission based on receiving the preemption indication.

Some examples of the method, apparatuses, and non-transitory computer-readable medium described herein may further include operations, features, means, or instructions for determining that the control message indicates that the UE is to interpret future indications received from the base station and pertaining to the uplink transmissions on the carrier as preemption indications, failing to receive a preemption indication in accordance with the control message indicating that the uplink transmission is to be preempted by another transmission and transmitting an entirety of the uplink transmission based on failing to receive the preemption indication.

Some examples of the method, apparatuses, and non-transitory computer-readable medium described herein may further include operations, features, means, or instructions for determining that the control message indicates that the UE is to interpret future indications received from the base station and pertaining to the uplink transmissions on the carrier as permission indications, receiving a permission indication in accordance with the control message indicating that the UE may have permission to transmit the uplink transmission and transmitting the uplink transmission based on receiving the permission indication.

Some examples of the method, apparatuses, and non-transitory computer-readable medium described herein may further include operations, features, means, or instructions for determining that the control message indicates that the UE is to interpret future indications received from the base station and pertaining to the uplink transmissions on the carrier as permission indications, failing to receive a permission indication in accordance with the control message indicating that the UE may have permission to transmit the uplink transmission and dropping the uplink transmission based on failing to receive the permission indication.

Some examples of the method, apparatuses, and non-transitory computer-readable medium described herein may further include operations, features, means, or instructions for receiving a monitoring indication in the uplink grant indicating whether the UE is to monitor the second downlink control channel for the preemption indication or the permission indication, the monitoring indication being based on whether the uplink transmission may be allowed to be preempted by another transmission and monitoring for the preemption indication or the permission indication in accordance with the monitoring indication.

In some examples of the method, apparatuses, and non-transitory computer-readable medium described herein, monitoring the second downlink control channel in accordance with the monitoring indication may include operations, features, means, or instructions for monitoring the second downlink control channel for the preemption indication or the permission indication based on the monitoring indication indicating that the UE is to monitor the second downlink control channel for the preemption indication or the permission indication.

In some examples of the method, apparatuses, and non-transitory computer-readable medium described herein, monitoring the second downlink control channel in accordance with the monitoring indication may include operations, features, means, or instructions for avoiding monitoring the second downlink control channel for the preemption indication or the permission indication based on the monitoring indication indicating that the UE is not to monitor the second downlink control channel for the preemption indication or the permission indication.

Some examples of the method, apparatuses, and non-transitory computer-readable medium described herein may further include operations, features, means, or instructions for transmitting the uplink transmission on the carrier regardless of whether the control message indicates that the UE is to interpret future indications received from the base station and pertaining to uplink transmission on the carrier as preemption indications or permission indications. In some examples of the method, apparatuses, and non-transitory computer-readable medium described herein, the indication of whether the UE is to interpret future indications received from the base station and pertaining to the uplink transmission on the carrier as either preemption indications or permission indications may be based on a probability of collisions between the uplink transmissions and other transmissions.

In some examples of the method, apparatuses, and non-transitory computer-readable medium described herein, the uplink transmissions include MBB transmissions and the other transmissions include low latency transmissions. In some examples of the method, apparatuses, and non-transitory computer-readable medium described herein, the control message includes an RRC message. In some examples of the method, apparatuses, and non-transitory computer-readable medium described herein, preemption indications and permission indications may be received in DCI messages having a same format.

A method for wireless communication at a base station is described. The method may include identifying a carrier to be used for uplink transmissions from a UE, determining whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmitting a control message indicating whether future indications transmitted to the UE and pertaining to the uplink transmissions on the carrier are to be interpreted as preemption indications or permission indications based on the determination.

An apparatus for wireless communication at a base station is described. The apparatus may include a processor, memory in electronic communication with the processor, and instructions stored in the memory. The instructions may be executable by the processor to cause the apparatus to identify a carrier to be used for uplink transmissions from a UE, determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmit a control message indicating whether future indications transmitted to the UE and pertaining to the uplink transmissions on the carrier are to be interpreted as preemption indications or permission indications based on the determination.

Another apparatus for wireless communication at a base station is described. The apparatus may include means for identifying a carrier to be used for uplink transmissions from a UE, determining whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmitting a control message indicating whether future indications transmitted to the UE and pertaining to the uplink transmissions on the carrier are to be interpreted as preemption indications or permission indications based on the determination.

A non-transitory computer-readable medium storing code for wireless communication at a base station is described. The code may include instructions executable by a processor to identify a carrier to be used for uplink transmissions from a UE, determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmit a control message indicating whether future indications transmitted to the UE and pertaining to the uplink transmissions on the carrier are to be interpreted as preemption indications or permission indications based on the determination.

Some examples of the method, apparatuses, and non-transitory computer-readable medium described herein may further include operations, features, means, or instructions for determining to transmit preemption indications pertaining to the uplink transmissions on the carrier, transmitting an uplink grant in a first downlink control channel for an uplink transmission on the carrier from the UE, transmitting a preemption indication indicating that the uplink transmission is to be preempted for another transmission and failing to receive at least a portion of the uplink transmission based on transmitting the preemption indication.

Some examples of the method, apparatuses, and non-transitory computer-readable medium described herein may further include operations, features, means, or instructions for determining to transmit preemption indications pertaining to the uplink transmissions on the carrier, transmitting an uplink grant in a first downlink control channel for an uplink transmission on the carrier from the UE, avoiding transmitting a preemption indication indicating that the uplink transmission is to be preempted for another transmission and receiving an entirety of the uplink transmission based on the avoiding.

Some examples of the method, apparatuses, and non-transitory computer-readable medium described herein may further include operations, features, means, or instructions for determining to transmit permission indications pertaining to the uplink transmissions on the carrier, transmitting an uplink grant in a first downlink control channel for an uplink transmission on the carrier from the UE, transmitting a permission indication indicating that the UE may have permission to transmit the uplink transmission and receiving the uplink transmission based on transmitting the permission indication.

Some examples of the method, apparatuses, and non-transitory computer-readable medium described herein may further include operations, features, means, or instructions for determining to transmit permission indications pertaining to the uplink transmissions on the carrier, transmitting an uplink grant in a first downlink control channel for an uplink transmission on the carrier from the UE, avoiding transmitting a permission indication indicating that the UE may have permission to transmit the uplink transmission and failing to receive the uplink transmission based on the avoiding.

Some examples of the method, apparatuses, and non-transitory computer-readable medium described herein may further include operations, features, means, or instructions for transmitting a monitoring indication in an uplink grant indicating whether the UE is to monitor for a preemption indication or a permission indication pertaining to an uplink transmission, the monitoring indication being based on whether the uplink transmission may be allowed to be preempted by another transmission.

In some examples of the method, apparatuses, and non-transitory computer-readable medium described herein, determining whether to transmit preemption indications or permission indications pertaining to the uplink transmissions on the carrier may include operations, features, means, or instructions for determining whether to transmit preemption indications or permission indications pertaining to the uplink transmissions on the carrier based on a probability of collisions between the uplink transmissions and other transmissions.

Some examples of the method, apparatuses, and non-transitory computer-readable medium described herein may further include operations, features, means, or instructions for determining that the probability of collisions between the uplink transmissions and the other transmissions may be above a threshold and determining to transmit permission indications pertaining to the uplink transmissions on the carrier. Some examples of the method, apparatuses, and non-transitory computer-readable medium described herein may further include operations, features, means, or instructions for determining that the probability of collisions between the uplink transmissions and the other transmissions may be below a threshold and determining to transmit preemption indications pertaining to the uplink transmissions on the carrier.

In some examples of the method, apparatuses, and non-transitory computer-readable medium described herein, the uplink transmissions include mobile broadband (MBB) transmissions and the other transmissions include low latency transmissions. In some examples of the method, apparatuses, and non-transitory computer-readable medium described herein, the control message includes an RRC message. In some examples of the method, apparatuses, and non-transitory computer-readable medium described herein, preemption indications and permission indications may be transmitted in DCI messages having a same format.

DETAILED DESCRIPTION

Figure 1:
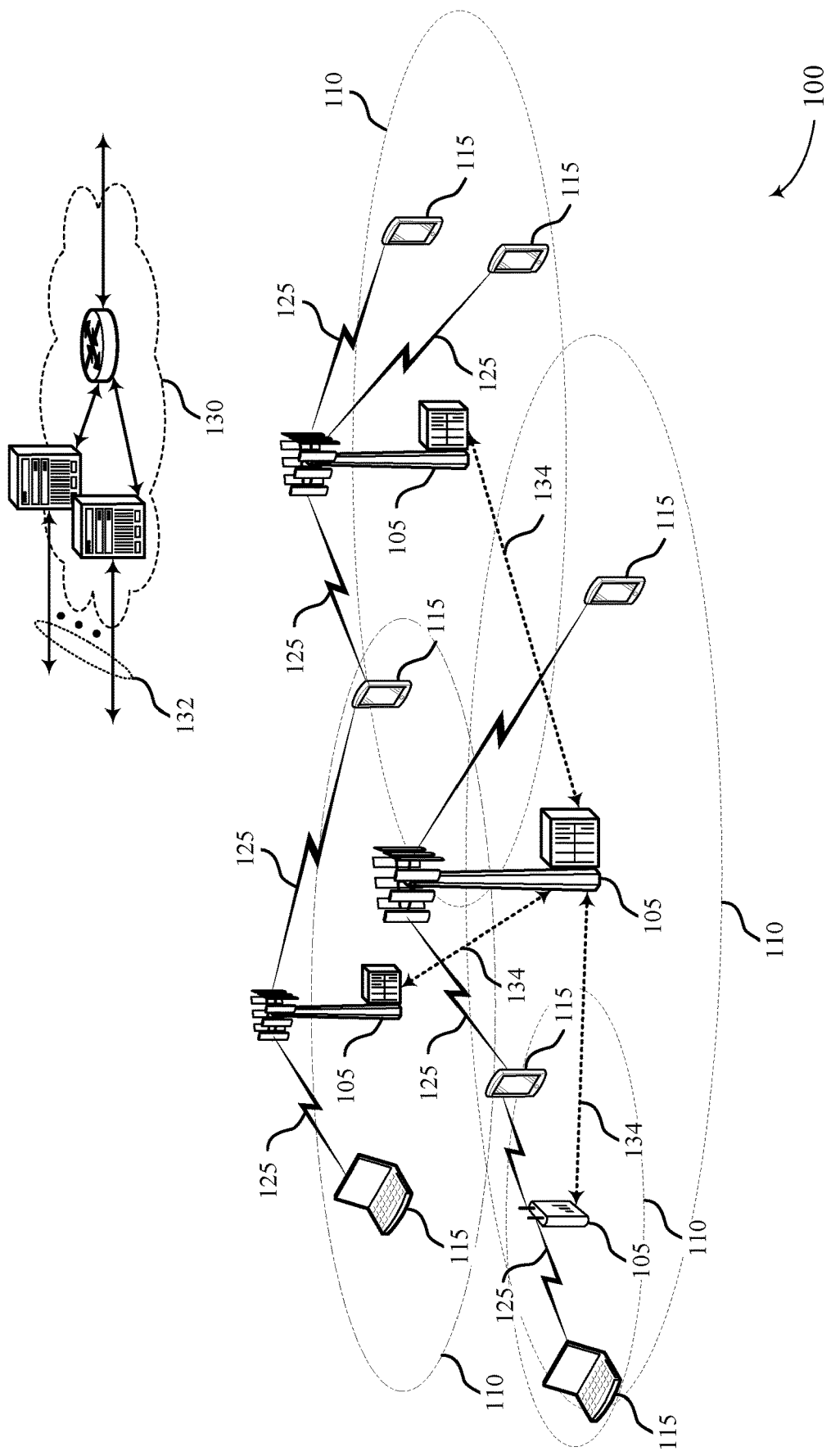
FIGS. 1 and 2 illustrate examples of wireless communications systems that support preemption indication and permission indication management for MBB and low latency communication multiplexing in accordance with aspects of the present disclosure.

Some wireless communications systems may support mobile broadband (MBB) communications and low latency communications. Low latency communications may be associated with bursty and unpredictable transmissions. To facilitate such communications, a base station may identify resources originally allocated for MBB communications, and the base station may reassign a portion of these resources for low latency communications (e.g., using puncturing). That is, the base station may preempt (or interrupt) MBB communications to accommodate bursty, low latency communications. Thus, low latency communications and MBB communications may be multiplexed using puncturing. In such cases, it may be appropriate for the base station to transmit a preemption indication to indicate to an MBB UE that resources allocated to the MBB UE are reassigned for low latency communications. Alternatively, the base station may transmit a permission indication to the MBB UE to indicate that the MBB UE is allowed to transmit on the uplink, and the base station may avoid transmitting a permission indication to the MBB UE when resources allocated to the MBB UE are reassigned for low latency communications.

In some wireless communications systems, a UE may be configured via RRC signaling to monitor a downlink control channel on a carrier for a preemption indication or a permission indication for an uplink or downlink transmission. Specifically, a base station 105 may transmit an RRC message that indicates whether the UE is to monitor the carrier for preemption indications or permission indications for uplink or downlink transmissions on the carrier. In such systems, however, since the UE may be configured using RRC signaling (e.g., statically configured) to monitor or avoid monitoring for a preemption indication or a permission indication on a carrier, the UE may monitor for a preemption indication or a permission indication from the base station even when it is unlikely that a downlink or uplink transmission is to be preempted for a low latency transmission, resulting in unnecessary power consumption at the UE. Further, in conventional systems, the use of preemption indications or permission indications may not be configured in consideration of overhead, and the overhead associated with transmitting preemption indications or permission indications may be high.

As described herein, a wireless communications system may support efficient techniques for supporting MBB and low latency communications multiplexing with limited overhead while limiting power consumption at an MBB UE. In one example, a base station may dynamically configure a UE to monitor or avoid monitoring for a preemption indication. Accordingly, the UE may have a lower chance of monitoring for a preemption indication when it is unlikely that an uplink or downlink transmission will be preempted. In another example, a base station may transmit a control message indicating whether future indications received from the base station are to be interpreted as preemption indications or permission indications. Accordingly, the base station may choose to use either preemption indications or permission indications (e.g., based on the probability of collisions between mobile broadband (MBB) and low latency transmissions) to facilitate MBB and low latency communication multiplexing with limited signaling.

Aspects of the disclosure introduced above are described below in the context of a wireless communications system. Examples of processes and signaling exchanges that support preemption indication and permission indication management for MBB and low latency communication multiplexing are then described. Aspects of the disclosure are further illustrated by and described with reference to apparatus diagrams, system diagrams, and flowcharts that relate to preemption indication and permission indication management for MBB and low latency communication multiplexing.

FIG. 1 illustrates an example of a wireless communications system 100 that supports preemption indication and permission indication management for MBB and low latency communication multiplexing in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support MBB communications, enhanced MBB (eMBB) communications, ultra-reliable (e.g., mission critical) communications, low latency communications, ultra-reliable low latency communications (URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in a frequency division duplex (FDD) mode), or be configured to carry downlink and uplink communications (e.g., in a time division duplex (TDD) mode). In some examples, signal waveforms transmitted over a carrier may be made up of multiple sub-carriers (e.g., using multi-carrier modulation (MCM) techniques such as orthogonal frequency division multiplexing (OFDM) or Discrete Fourier Transform spread OFDM (DFT-s-OFDM)).

Wireless communications system 100 may support multiplexing of different type of communications on a carrier (e.g., MBB communications and low latency communications). In some cases, a base station 105 may semi-statically allocate resources of a carrier for low latency communications and MBB communications, and these different types of communications may be multiplexed over time and frequency resources. However, because low latency communications may be unpredictable, it may be challenging for a base station to allocate an appropriate amount of resources for low latency communications with a UE 115. For example, if the base station allocates a small amount of resources for low latency communications, there may not be sufficient resources available for communication when data traffic is high. Alternatively, if a base station allocates a large amount of resources for low latency communications, resources may be unused when data traffic is low.

Accordingly, rather than semi-statically allocating resources for low latency communications, a base station 105 may preempt (or interrupt) MBB communications (e.g., using puncturing) to accommodate bursty, low latency communications. Thus, low latency communications and MBB communications may be multiplexed using puncturing (e.g., to facilitate improved spectrum utilization). In such cases, it may be appropriate for the base station 105 to transmit a preemption indication (e.g., in a downlink control information (DCI) message that is different from the DCI message used to transmit an uplink or downlink grant) to indicate to a UE 115 operating in an MBB mode (e.g., an MBB UE 115) that resources allocated to the MBB UE 115 are reassigned for the low latency communications. For the preemption of a downlink MBB transmission in a PDSCH, the base station 105 may transmit the preemption indication in a PDCCH following the PDSCH, and, for the preemption of an uplink MBB transmission in a PUSCH, the base station 105 may transmit the preemption indication in a PDCCH preceding the PUSCH. Alternatively, the base station 105 may transmit a permission indication to the MBB UE 115 to indicate that the MBB UE 115 is allowed to transmit on the uplink, and the base station 105 may avoid transmitting a permission indication to the MBB UE 115 when resources allocated to the MBB UE 115 are reassigned for low latency communications.

In some wireless communications systems, a UE 115 may be configured via RRC signaling to monitor a PDCCH on a carrier for a preemption indication for an uplink or downlink transmission (e.g., used to preempt the uplink or downlink transmission). Specifically, a base station 105 may transmit an RRC message that indicates that the UE 115 is to monitor the carrier for the preemption indication for the uplink or downlink transmission. The RRC message may also indicate a periodicity for monitoring for preemption indications on the carrier such that the UE 115 may monitor for a preemption indication for each uplink or downlink transmission on the carrier. In such systems, however, the UE 115 may monitor for preemption indications from the base station 105 even when it is unlikely that a downlink or uplink transmission is to be preempted for a low latency transmission. That is, the UE 115 may use a large portion of a blind-decoding budget to monitor for preemption indications that are unlikely to be received, resulting in increased power consumption at the UE 115 and a limited decoding budget. Further, in conventional systems, the use of preemption indications or permission indications may not be configured in consideration of overhead, and the overhead associated with transmitting preemption indications or permission indications may be high. Wireless communications system 100 may support efficient techniques for facilitating MBB and low latency communications multiplexing with limited overhead while limiting power consumption at MBB UEs 115.

Figure 2:
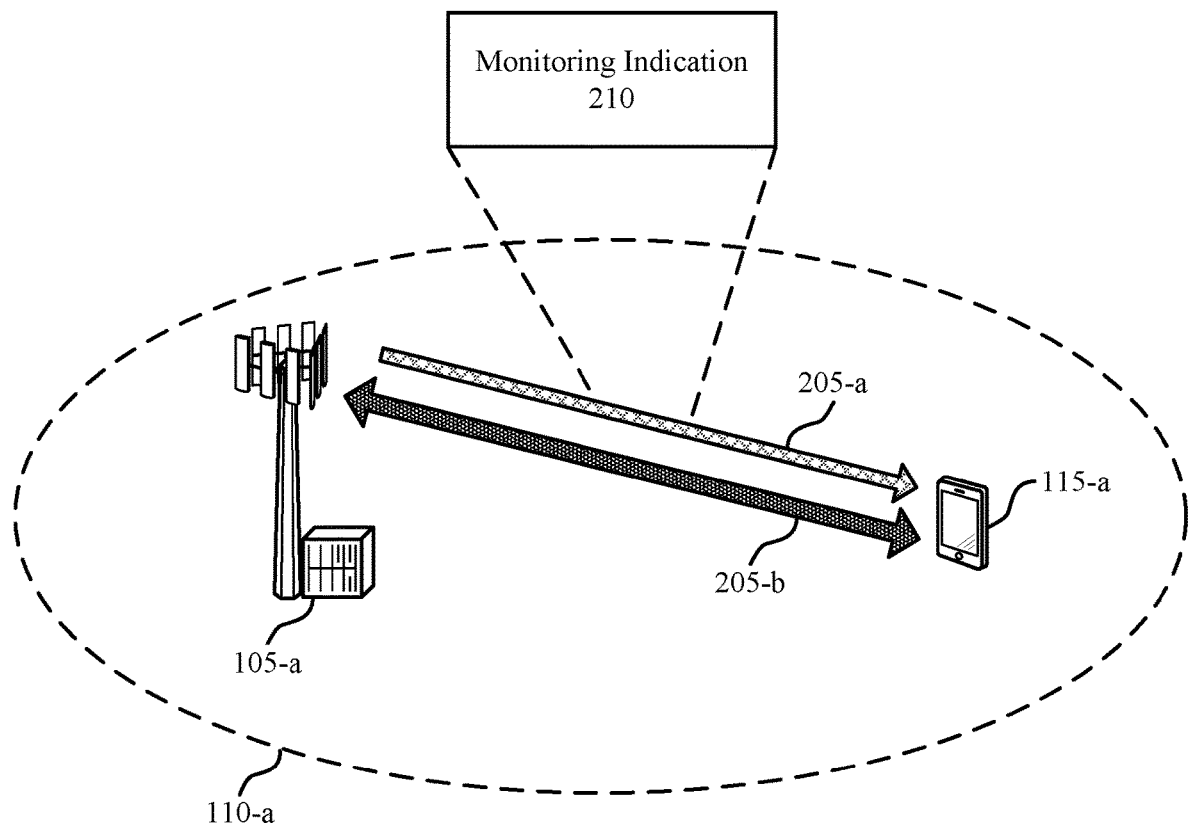

FIG. 2 illustrates an example of a wireless communications system 200 that supports preemption indication and permission indication management for MBB and low latency communication multiplexing in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a. UE 115-a may operate in an MBB mode and may be referred to as an MBB UE 115-a. MBB UE 115-a may support MBB communications with base station 105-a and, in some cases, may also support low latency communications with base station 105-a. Wireless communications system 200 may implement aspects of wireless communications system 100. For example, wireless communications system 200 may support efficient techniques for facilitating MBB and low latency communications multiplexing while limiting power consumption at MBB UE 115-a.

In the example of FIG. 2, base station 105-a may dynamically configure MBB UE 115-a to monitor for a preemption indication for an uplink or downlink transmission (or a set of uplink or downlink transmissions). In particular, base station 105-a may transmit a monitoring indication 210 in a grant on carrier 205-a to UE 115-a that indicates whether UE 115-a is to monitor for a preemption indication for an uplink or downlink transmission scheduled by the grant. The monitoring indication 210 may be a one-bit field, where a one may indicate that UE 115-a is to monitor for a preemption indication (e.g., used when the scheduled uplink or downlink transmission is likely to be preempted by a low latency transmission), and a zero may indicate that UE 115-a is to avoid monitoring for a preemption indication (e.g., used when the scheduled uplink or downlink transmission will not be or is not likely to be preempted by a low latency transmission). Base station 105-a may then communicate with UE 115-a on carrier 205-b based on whether the monitoring indication 210 indicates that UE 115-a is to monitor for a preemption indication for an uplink or downlink transmission scheduled by the grant or that UE 115-a is to avoid monitoring for the preemption indication for the uplink or downlink transmission scheduled by the grant.

In one example, if the monitoring indication 210 is included in a downlink scheduling grant (e.g., that schedules a downlink transmission), the monitoring indication 210 may indicate to UE 115-a whether UE 115-a is to monitor for a downlink preemption indication. In another example, if the monitoring indication 210 is included in an uplink scheduling grant (e.g., that schedules an uplink transmission), the monitoring indication 210 may indicate to UE 115-a whether UE 115-a is to monitor for an uplink preemption indication. A downlink preemption indication may be used to indicate whether a downlink transmission from base station 105-a to UE 115-a is to be punctured or not, and an uplink preemption indication may be used to indicate whether an uplink transmission from UE 115-a to base station 105-a is to be punctured or not. The uplink preemption indication may also be known as an uplink cancellation indication.

In some aspects, base station 105-a may determine whether to configure UE 115-a to monitor for a preemption indication for an uplink or downlink transmission based on a number of factors. In one example, base station 105-a may determine whether to configure UE 115-a to monitor for a preemption indication for an uplink or downlink transmission based on traffic conditions or channel conditions. In this example, if traffic conditions (e.g., traffic history) or channel conditions (e.g., reliability of the channel) indicate a high likelihood that a low latency transmission is to be scheduled on resources allocated to UE 115-a for the uplink or downlink transmission, base station 105-a may configure UE 115-a to monitor for a preemption indication for the uplink or downlink transmission. Alternatively, if traffic conditions or channel conditions indicate a low likelihood that a low latency transmission is to be scheduled on resources allocated to UE 115-a for the uplink or downlink transmission, base station 105-a may configure UE 115-a to avoid monitoring for a preemption indication for the uplink or downlink transmission.

In another example, base station 105-a may determine whether to configure UE 115-a to monitor for a preemption indication for an uplink or downlink transmission based on a priority associated with the uplink or downlink transmission. In this example, if the uplink or downlink transmission is a low priority transmission (e.g., an MBB transmission), base station 105-a may configure UE 115-a to monitor for a preemption indication for the uplink or downlink transmission. Alternatively, if the uplink or downlink transmission is a high priority transmission (e.g., a low latency transmission), base station 105-a may configure UE 115-a to avoid monitoring for a preemption indication for the uplink or downlink transmission.

In yet another example, base station 105-a may determine whether to configure UE 115-a to monitor for a preemption indication for an uplink or downlink transmission based on an amount of DCI transmitted to UE 115-a and a decoding budget at UE 115-a. In this example, if the amount of DCI transmitted to UE 115-a is below a threshold and/or the decoding budget at UE 115-a is above a threshold, base station 105-a may configure UE 115-a to monitor for a preemption indication for the uplink or downlink transmission (e.g., since the UE 115-a may be able to decode the additional DCI). Alternatively, if the amount of DCI transmitted to UE 115-a is above a threshold and/or the decoding budget at UE 115-a is below a threshold, base station 105-a may configure UE 115-a to avoid monitoring for a preemption indication for the uplink or downlink transmission (e.g., since the UE 115-a may not be able to decode the additional DCI). In some examples, the decoding budget at UE 115-a may be based on UE capability, and UE 115-a may transmit an indication of the decoding budget to base station 105-a.

In some cases, base station 105-a may transmit the monitoring indication 210 in a first downlink control channel (e.g., carrying a first DCI message), and the monitoring indication may configure UE 115-a to monitor or avoid monitoring a second downlink control channel (e.g., potentially carrying a second DCI message) for a preemption indication for an uplink or downlink transmission, where the second downlink control channel may follow the first downlink control channel. In some cases, a UE 115-a may be configured via RRC signaling to monitor for the monitoring indication 210. In other cases, if the UE 115-a is incapable of monitoring for the monitoring indication 210, the UE 115-a may avoid monitoring for the monitoring indication 210. In some examples, base station 105-a may configure UE 115-a via RRC signaling to monitor or avoid monitoring for preemption indications for uplink or downlink transmissions on a carrier (e.g., where the monitoring indication 210 may override the RRC signaling). Further, base station 105-a may also configure UE 115-a via RRC signaling to monitor or avoid monitoring for monitoring indications (e.g., monitoring indication 210).

Figure 3:
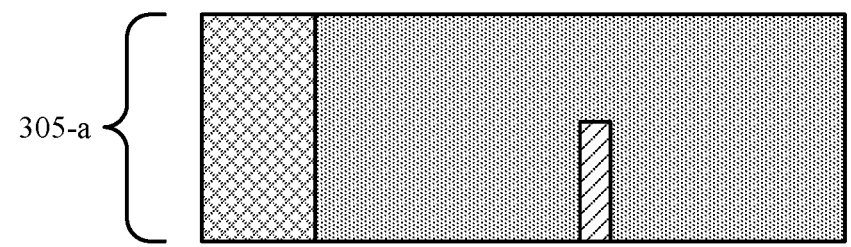
FIG. 3 illustrates an example of MBB and low latency communication multiplexing in accordance with aspects of the present disclosure.
Figure 3:
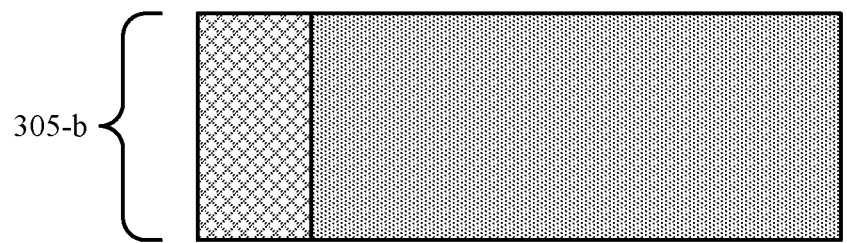

FIG. 3 illustrates an example of MBB and low latency communication multiplexing 300 in accordance with aspects of the present disclosure. In the example of FIG. 3, base station 105-a may configure a first carrier 305-a and a second carrier 305-b for communications with UE 115-a, where first carrier 305-a may be configured for MBB communications and low latency communications (e.g., where the MBB communications may be preempted for low latency communications), and second carrier 305-b may be configured for only MBB communications (e.g., where the MBB communications may not be preempted for low latency communications). Accordingly, for MBB communications 315 on the first carrier 305-a, base station 105-a may transmit a monitoring indication 210 in PDCCH 310 (e.g., in a grant) to indicate whether UE 115-a is to monitor for a preemption indication for the MBB communications 315. For MBB communications 315 on the second carrier 305-b, base station 105-a may semi-statically configure UE 115-a not to monitor for a preemption indication. Thus, UE 115-a may monitor for a monitoring indication 210 in the PDCCH on the first carrier 305-a and may not monitor for a preemption indication for MBB communications 315 on the second carrier 305-b.

If UE 115-a is configured to monitor for a preemption indication (e.g., by a monitoring indication 210), and UE 115-a receives a preemption indication for MBB communications 315 on first carrier 305-a, UE 115-a may drop a portion of an uplink transmission on the first carrier 305-a or avoid processing or monitoring for a portion of a downlink transmission on the first carrier 305-a (e.g., to accommodate low latency communications 320). For instance, if UE 115-a is configured to monitor for an uplink preemption indication, and UE 115-a receives the uplink preemption indication for MBB communications 315 on first carrier 305-a, UE 115-a may drop a portion of an uplink transmission on the first carrier 305-a on the resources punctured for other communications. Alternatively, if UE 115-a is configured to monitor for a downlink preemption indication, and the UE 115-a receives the downlink preemption indication for MBB communications 315 on first carrier 305-a, UE 115-a may determine whether a part of a received downlink transmission is preempted by another transmission or not (e.g., where UE 115-a may avoid attempting to process or avoid monitoring for the preempted part of the received downlink transmission).

Alternatively, if UE 115-a is configured to monitor for a preemption indication (e.g., by a monitoring indication 210), and UE 115-a fails to receive a preemption indication for MBB communications 315 on first carrier 305-a, UE 115-a may transmit an entirety of an uplink transmission or receive an entirety of a downlink transmission on the first carrier 305-a. Further, if UE 115-a is not configured to monitor for a preemption indication on the first carrier 305-a, UE 115-a may also transmit an entirety of an uplink transmission or receive an entirety of a downlink transmission on the first carrier 305-a. Since UE 115-a may be configured to monitor or avoid monitoring for a preemption indication dynamically (e.g., using the monitoring indication 210), UE 115-a may be less likely to monitor for a preemption indication when the preemption indication is unlikely to be received, resulting in reduced power consumption at UE 115-a. That is, base station 105-a may use the monitoring indication 210 to configure UE 115-a to avoid monitoring for preemption indications when it is unlikely that communications with the UE 115-a will be preempted.

Although the examples described above relate to dynamically indicating to UE 115-a when to monitor for preemption indications from a base station 105-a, it is to be understood that similar techniques may be applied for indicating to UE 115-a when to monitor for permission indications. In particular, the monitoring indication 210 may indicate to UE 115-a when to monitor for permission indications from base station 105-*a*. In this case, when UE 115-*a* is configured to monitor for a permission indication, and UE 115-*a* fails to receive a permission indication, UE 115-*a* may drop an uplink transmission or a portion of the uplink transmission. Alternatively, when UE 115-*a* is configured to monitor for a permission indication, and UE 115-*a* receives a permission indication, UE 115-*a* may transmit an entirety of an uplink transmission. Further, when UE 115-*a* is not configured to monitor for a permission indication, UE 115-*a* may also transmit an entirety of an uplink transmission. Techniques for determining when to use preemption indications and permission indications for MBB and low latency communication multiplexing and techniques for signaling to a UE 115 whether preemption indications or permission indications are being used for MBB and low latency communication multiplexing are described with reference to FIGS. 4 and 5.

Figure 4:
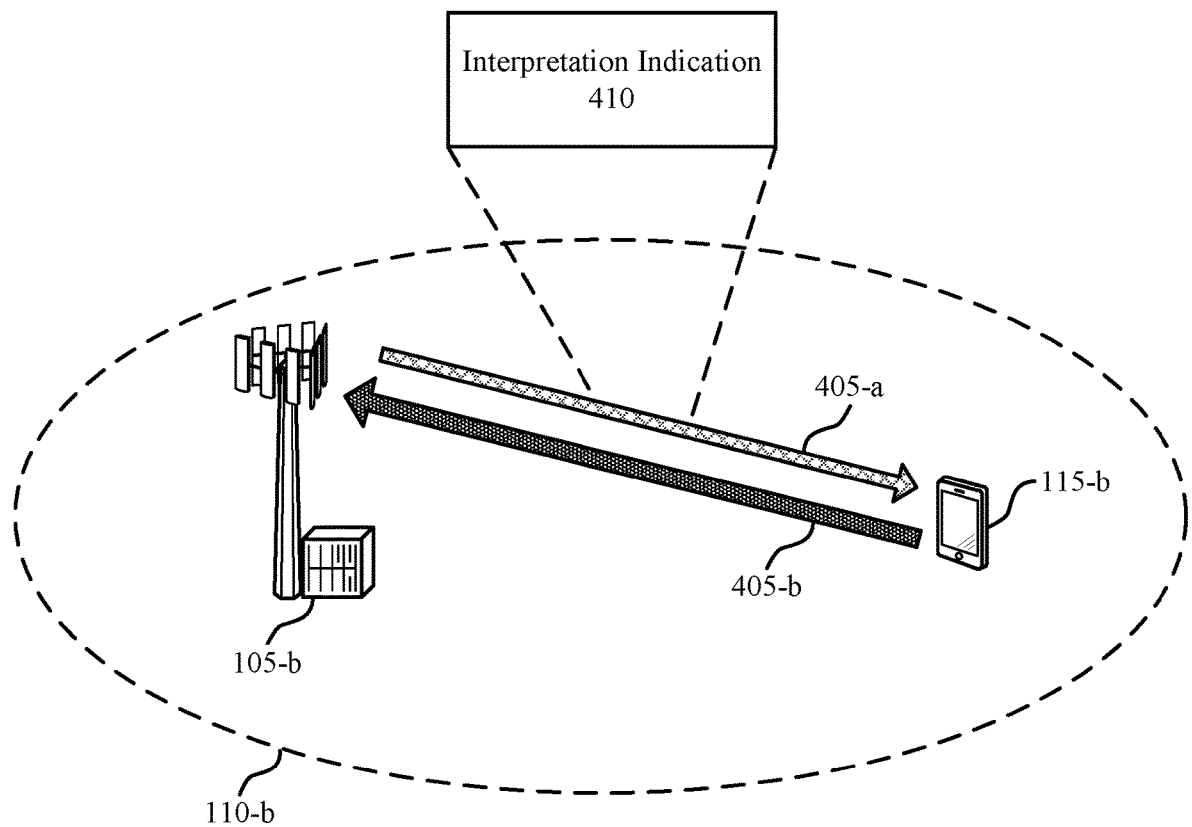
FIG. 4 illustrates an example of a wireless communications system that supports preemption indication and permission indication management for MBB and low latency communication multiplexing in accordance with aspects of the present disclosure.

FIG. 4 illustrates an example of a wireless communications system 400 that supports preemption indication and permission indication management for MBB and low latency communication multiplexing in accordance with aspects of the present disclosure. Wireless communications system 400 includes base station 105-*b*, which may be an example of a base station 105 described with reference to FIGS. 1-3. Wireless communications system 400 also includes UE 115-*b*, which may be an example of a UE 115 described with reference to FIGS. 1-3. Base station 105-*b* may provide communication coverage for a respective coverage area 110-*b*. UE 115-*b* may operate in an MBB mode and may be referred to as an MBB UE 115-*b*. MBB UE 115-*b* may support MBB communications with base station 105-*b*, and, in some cases, may also support low latency communications with base station 105-*b*. Wireless communications system 400 may implement aspects of wireless communications system 100. For example, wireless communications system 400 may support efficient techniques for facilitating MBB and low latency communications multiplexing with limited overhead.

In the example of FIG. 4, base station 105-*b* may transmit an interpretation indication 410 (e.g., in an RRC message) on carrier 405-*a* that indicates whether UE 115-*b* is to interpret future indications received from base station 105-*b* and pertaining to uplink transmissions on a carrier as either preemption indications or permission indications. That is, since preemption indications and permission indications may be transmitted in DCI having a same format (i.e., signaled using the same mechanism (e.g., same bit)), and the UE 115-*b* may monitor for preemption indications and permission indications using the same techniques, it may be appropriate for UE 115-*b* to identify whether DCI received from base station 105-*b* includes a preemption indication or a permission indication for MBB and low latency communication multiplexing.

The interpretation indication 410 may be a one-bit field, where a one may indicate that future indications received from base station 105-*b* and pertaining to uplink transmissions on a carrier correspond to preemption indications, and a zero may indicate that future indications received from base station 105-*b* and pertaining to uplink transmissions on a carrier correspond to permission indications (or vice versa). That is, the interpretation indication 410 may indicate to UE 115-*b* that the use case or purpose of future indications corresponds to preemption indications or permission indications. UE 115-*b* may therefore receive the interpretation indication 410 and may determine whether to interpret future indications as preemption indications or permission indications.

Base station 105-*b* may determine whether to use preemption indications or permission indications for MBB and low latency communication multiplexing based on a probability of collisions between MBB transmissions and low latency transmissions. In one example, if the probability of collisions between MBB transmissions and low latency transmissions is less than 50% (e.g., per MBB packet), base station 105-*b* may use preemption indications to indicate to UE 115-*b* that a scheduled transmission is to be preempted by a low latency transmission (e.g., since the preemption indication may be transmitted less than 50% of the time). In another example, if the probability of collisions between MBB transmissions and low latency transmissions is greater than 50% (e.g., per MBB packet), base station 105-*b* may use permission indications to indicate when UE 115-*b* is allowed to transmit a scheduled transmission (e.g., since the permission indications may be transmitted less than 50% of the time). Using these techniques, base station 105-*b* may use the interpretation indication 410 to semi-statically or dynamically adjust the interpretation of indications based on the traffic load of MBB and low latency communications (and/or other factors), thereby reducing the control overhead resulting from the transmissions of preemption indications or permission indications.

Figure 5:
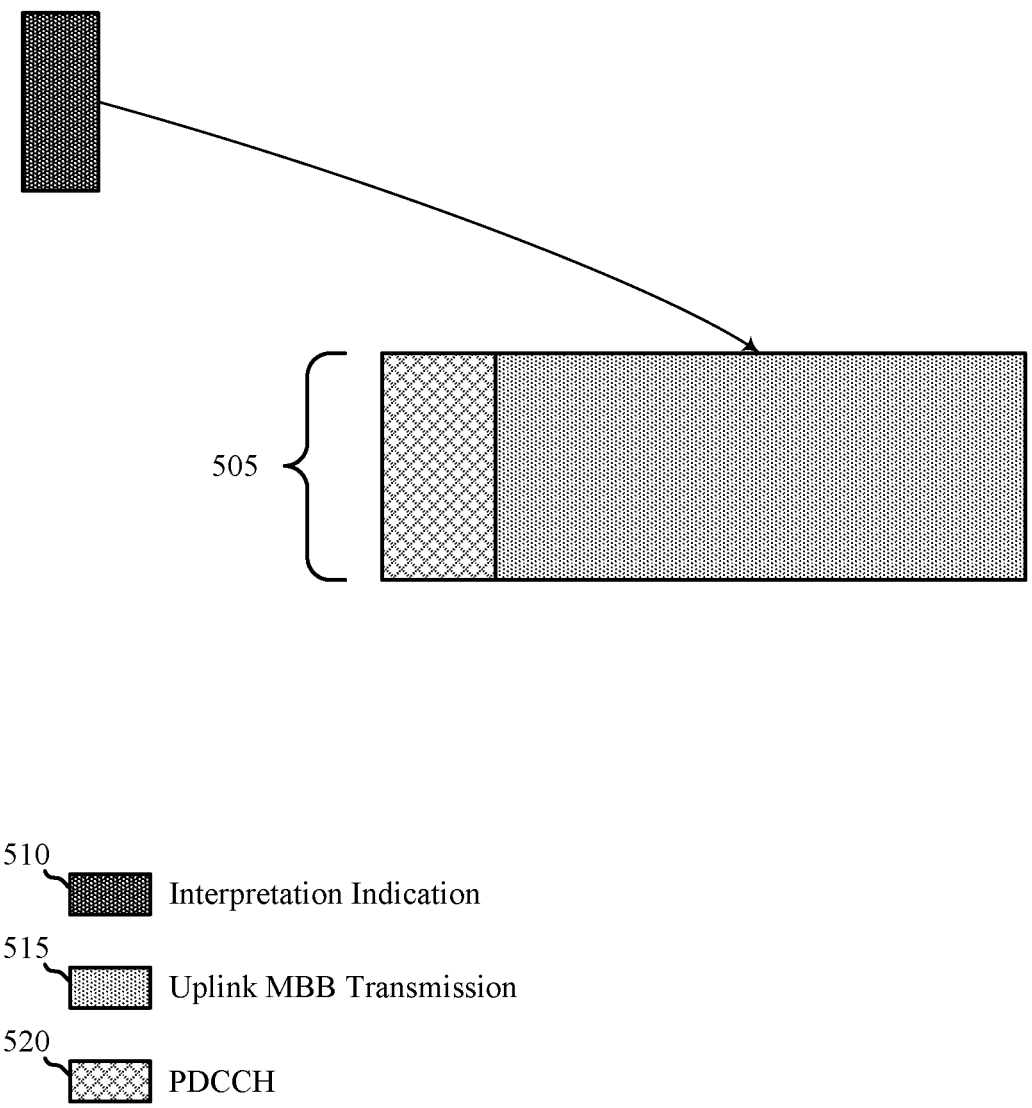
FIG. 5 illustrates an example of resources allocated for MBB communications in accordance with aspects of the present disclosure.

FIG. 5 illustrates an example of resources 500 allocated for MBB communications in accordance with aspects of the present disclosure. In the example of FIG. 5, base station 105-*b* may transmit an interpretation indication 510 (e.g., in an RRC message) to UE 115-*a* for an uplink MBB transmission 515 on a carrier 505 (and all other uplink MBB transmissions on the carrier 505, until updated in a subsequent RRC message). Base station 105-*b* may also transmit a grant in PDCCH 520 for an uplink MBB transmission 515.

In some cases, the interpretation indication 510 may indicate that future indications transmitted to UE 115-*b* and pertaining to uplink transmissions on carrier 505 are to be interpreted as preemption indications. In such cases, if UE 115-*b* fails to receive a preemption indication for uplink MBB transmission 515, UE 115-*b* may transmit an entirety of the uplink MBB transmission 515. Alternatively, if UE 115-*b* receives a preemption indication for uplink MBB transmission 515, UE 115-*b* may drop at least a portion of the uplink MBB transmission 515. In other cases, the interpretation indication 510 may indicate that future indications transmitted to UE 115-*b* and pertaining to uplink transmissions on carrier 505 are to be interpreted as permission indications. In such cases, if UE 115-*b* fails to receive a permission indication for uplink MBB transmission 515, UE 115-*b* may drop the uplink MBB transmission 515 or a portion of the uplink MBB transmission 515. Alternatively, if UE 115-*b* receives a permission indication for uplink MBB transmission 515, UE 115-*b* may transmit an entirety of the uplink MBB transmission 515 or at least a portion of the uplink MBB transmission 515 (e.g., based on the permission indication).

Figure 6:
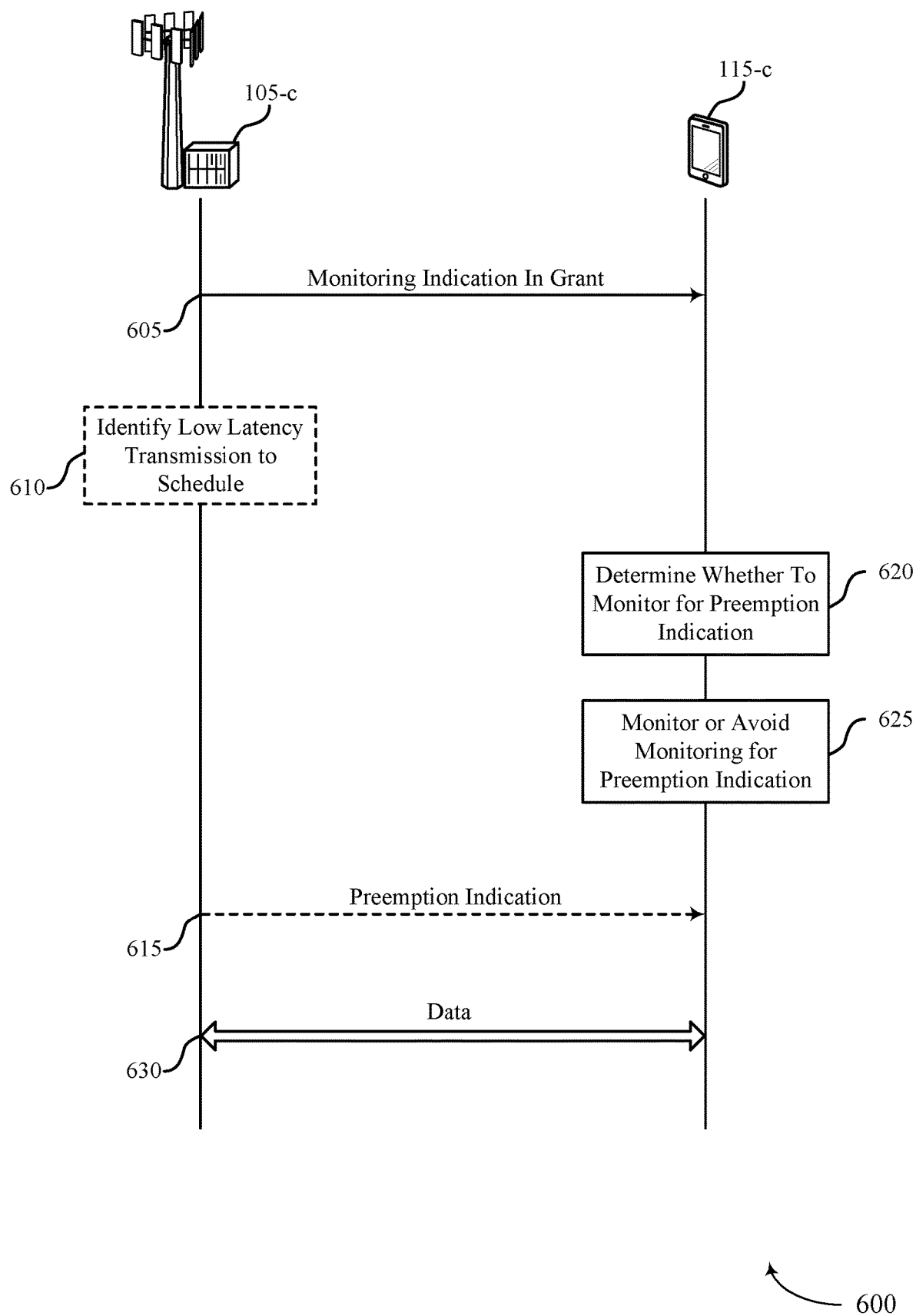
FIGS. 6 and 7 illustrate examples of process flows that support preemption indication and permission indication management for MBB and low latency communication multiplexing in accordance with aspects of the present disclosure.

FIG. 6 illustrates an example of a process flow 600 that supports preemption indication and permission indication management for MBB and low latency communication multiplexing in accordance with aspects of the present disclosure. It is to be understood that the timing of the processes illustrated in process flow 600 may be flexible (e.g., may be different from the timing illustrated). Process flow 600 illustrates aspects of techniques performed by a base station 105-*c*, which may be an example of a base station 105 described with reference to FIGS. 1-5. Process flow 600 also illustrates aspects of techniques performed by a UE 115-*c*, which may be an example of a UE 115 described with reference to FIGS. 1-5. UE 115-c may be an example of an MBB UE (i.e., a UE supporting MBB communications with base station 105-c). In some cases, however, MBB UE 115-c may also support low latency communications.

At 605, base station 105-c may transmit, and UE 115-c may receive, a preemption monitoring indication in a grant (e.g., a one-bit field in DCI) in a first downlink channel. The grant may be for an uplink or downlink transmission, and the preemption monitoring indication may indicate whether UE 115-c is to monitor a second downlink control channel for a preemption indication for the uplink or downlink transmission. In some examples, the grant may be a semi-persistent scheduling (SPS) grant scheduling multiple uplink or downlink transmissions, and the preemption monitoring indication may indicate whether UE 115-c is to monitor a second downlink control channel for a preemption indication for each of the uplink or downlink transmissions. Base station 105-c may determine whether to configure the UE 115-c to monitor for the preemption indication based on channel conditions or traffic conditions, a priority associated with the uplink or downlink transmission, an amount of DCI transmitted to UE 115-c and a decoding budget at the UE, etc. In some cases, base station 105-c may configure UE 115-c using RRC signaling to monitor the first downlink control channel for the monitoring indication.

At 610, base station 105-c may identify a low latency transmission to schedule on resources allocated to UE 115-c for the uplink or downlink transmission. At 615, base station 105-c may then transmit a preemption indication in the second downlink control channel to UE 115-c. In other cases, base station 105-c may not identify any low latency transmissions to schedule on resources allocated to UE 115-c for the uplink or downlink transmission, and the base station 105-c may avoid transmitting a preemption indication in the second downlink control channel. Regardless of whether base station 105-c determines to transmit a preemption indication, however, at 620, UE 115-c may determine whether to monitor for a preemption indication based on the monitoring indication received at 605.

In one example, the monitoring indication may indicate that the UE 115-a is to monitor the second downlink control channel for the preemption indication, and, at 625, UE 115-c may monitor the second downlink control channel for the preemption indication. In another example, the monitoring indication may indicate that the UE 115-a is not to monitor the second downlink control channel for the preemption indication, and, at 625, UE 115-c may avoid monitoring the second downlink control channel for the preemption indication. At 630, UE 115-c may then communicate with base station 105-c. For instance, UE 115-c may transmit the uplink transmission or receive the downlink transmission based on the result of determining whether to monitor for a preemption indication for the uplink or downlink transmission and on whether a preemption indication was received for the uplink or downlink transmission (e.g., in the event that UE 115-c determines to monitor for the preemption indication).

If UE 115-c is configured to monitor for a preemption indication, and UE 115-c receives the preemption indication, UE 115-c may drop a portion of an uplink transmission or avoid attempting to decode a portion of a downlink transmission based on the preemption indication. In one example, if UE 115-c is configured to monitor for a downlink preemption indication, and UE 115-c receives the downlink preemption indication, UE 115-c may determine whether a part of a downlink transmission is preempted and may avoid attempting to decode the part of the downlink transmission that is preempted. In another example, if UE 115-c is configured to monitor for an uplink preemption indication, and UE 115-c receives the uplink preemption indication, UE 115-c may drop a portion of an uplink transmission (e.g., the portion of the uplink transmission that is preempted). Alternatively, if UE 115-c is not configured to monitor for a preemption indication (e.g., downlink or uplink preemption indication), or UE 115-c is configured to monitor for a preemption indication and fails to receive the preemption indication (e.g., downlink or uplink preemption indication), UE 115-c may transmit an entirety of an uplink transmission or receive an entirety of a downlink transmission.

Although the above techniques relate to a UE 115-c being configured to monitor for a preemption indication, it is to be understood that UE 115-c may also be configured to monitor for a permission indication for an uplink transmission. In particular, the monitoring indication may indicate whether UE 115-c is to monitor a second downlink control channel for a permission indication. In this case, if UE 115-c is configured to monitor for a permission indication, and UE 115-c fails to receive the permission indication, UE 115-c may avoid transmitting an uplink transmission or avoid transmitting a portion of the uplink transmission. Alternatively, if UE 115-c is configured to monitor for a permission indication, and UE 115-c receives the permission indication, UE 115-c may transmit an entirety of an uplink transmission or at least a portion of the uplink transmission. Further, if UE 115-c is not configured to monitor for a permission indication, UE 115-c may also transmit an entirety of an uplink transmission.

Figure 7:
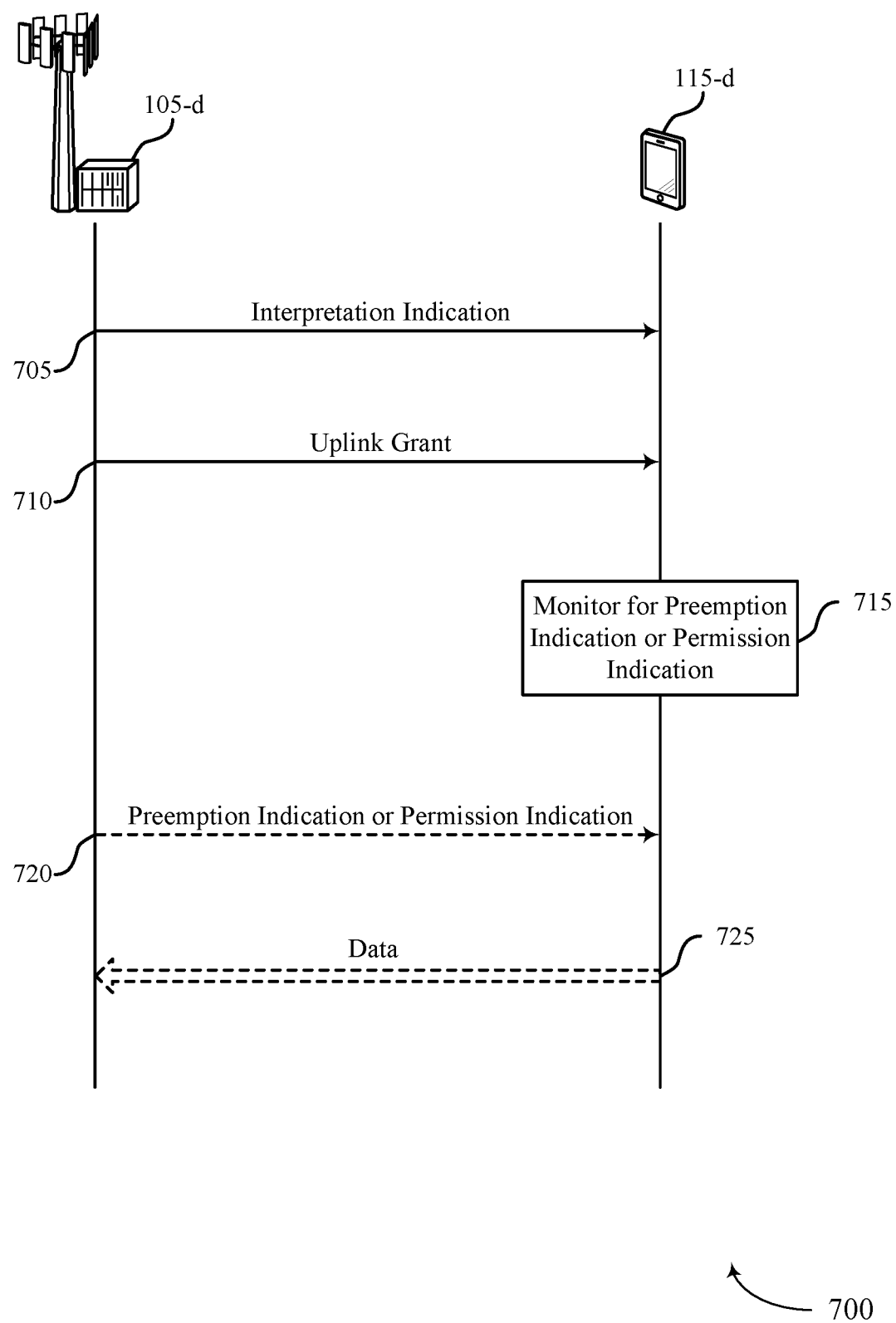

FIG. 7 illustrates an example of a process flow 700 that supports preemption indication and permission indication management for MBB and low latency communication multiplexing in accordance with aspects of the present disclosure. It is to be understood that the timing of the processes illustrated in process flow 700 may be flexible (e.g., may be different from the timing illustrated). Process flow 700 illustrates aspects of techniques performed by a base station 105-d, which may be an example of a base station 105 described with reference to FIGS. 1-6. Process flow 700 also illustrates aspects of techniques performed by a UE 115-d, which may be an example of a UE 115 described with reference to FIGS. 1-6. UE 115-d may be an example of an MBB UE (i.e., a UE supporting MBB communications with base station 105-d). In some cases, however, MBB UE 115-d may also support low latency communications.

At 705, base station 105-d may transmit, and UE 115-d may receive, an interpretation indication (e.g., in a control message, such as an RRC message) indicating whether UE 115-d is to interpret future indications received from base station 105-d and pertaining to uplink transmissions on a carrier as either preemption indications or permission indications. Base station 105-d may determine whether to transmit preemption indications or permission indications pertaining to the uplink transmissions on the carrier based on a probability of collisions between the uplink transmissions and other transmissions. For example, if base station 105-d determines that the probability of collisions between the uplink transmissions and the other transmissions is above a threshold (e.g., collisions are more likely to happen), base station 105-d may determine to transmit permission indications pertaining to the uplink transmissions on the carrier (e.g., since the use of permission indications may involve less signaling). Alternatively, if base station 105-d determines that the probability of collisions between the uplink transmissions and the other transmissions is below a threshold (e.g., collisions are less likely to happen), base station 105-*d* may determine to transmit preemption indications pertaining to the uplink transmissions on the carrier (e.g., since the use of preemption indications may involve less signaling).

At 710, base station 105-*d* may transmit an uplink grant to UE 115-*d*, and, at 715, UE 115-*d* may monitor for a preemption indication or a permission indication in a second downlink control channel based on the interpretation indication received at 705. At 720, base station 105-*d* may then transmit a preemption indication or a permission indication to UE 115-*d* for the uplink transmission. Alternatively, base station 105-*d* may avoid transmitting a preemption indication or a permission indication to UE 115-*d* for the uplink transmission. At 725, UE 115-*c* may then determine whether to transmit a portion of the uplink transmission, transmit an entirety of the uplink transmission, or drop the uplink transmission (or a portion of the uplink transmission) based on receiving or failing to receive a preemption indication or a permission indication for the uplink transmission.

In one example, UE 115-*d* may determine that the interpretation indication indicates that the UE 115-*d* is to interpret future indications received from base station 105-*d* and pertaining to uplink transmissions on the carrier as preemption indications. In this example, if UE 115-*d* receives a preemption indication indicating that the uplink transmission is to be preempted by another transmission, UE 115-*d* may drop at least a portion of the uplink transmission based on receiving the preemption indication. Alternatively, if UE 115-*d* fails to receive a preemption indication indicating that the uplink transmission is to be preempted by another transmission, UE 115-*d* may transmit an entirety of the uplink transmission based on failing to receive the preemption indication.

In another example, UE 115-*d* may determine that the interpretation indication indicates that the UE 115-*d* is to interpret future indications received from base station 105-*d* and pertaining to uplink transmissions on the carrier as permission indications. In this example, if UE 115-*d* receives a permission indication indicating that the UE has permission to transmit the uplink transmission, UE 115-*d* may transmit the uplink transmission based on receiving the permission indication. Alternatively, if UE 115-*d* fails to receive a permission indication indicating that the UE 115-*d* has permission to transmit the uplink transmission, UE 115-*d* may drop the uplink transmission (or a portion of the uplink transmission) based on failing to receive the permission indication.

In some cases, the techniques described with reference to FIG. 7 may be combined with the techniques described with reference to FIG. 6. In such cases, base station 105-*d* may transmit a monitoring indication in the uplink grant transmitted at 710 that indicates whether the UE 115-*d* is to monitor the second downlink control channel for the preemption indication or the permission indication. If the monitoring indication indicates that the UE 115-*d* is to monitor the second downlink control channel for the preemption indication or the permission indication, UE 115-*d* may monitor the second downlink control channel for the preemption indication or the permission indication. Alternatively, if the monitoring indication indicates that the UE 115-*d* is not to monitor the second downlink control channel for the preemption indication or the permission indication, UE 115-*d* may avoid monitoring the second downlink control channel for the preemption indication or the permission indication. If the UE 115-*d* avoids monitoring the second downlink control channel for the preemption indication or the permission indication, UE 115-*d* may transmit the uplink transmission on the carrier regardless of whether the interpretation indication indicates that the UE 115-*d* is to interpret future indications received from base station 105-*d* and pertaining to uplink transmissions on the carrier as preemption indications or permission indications.

Figure 8:
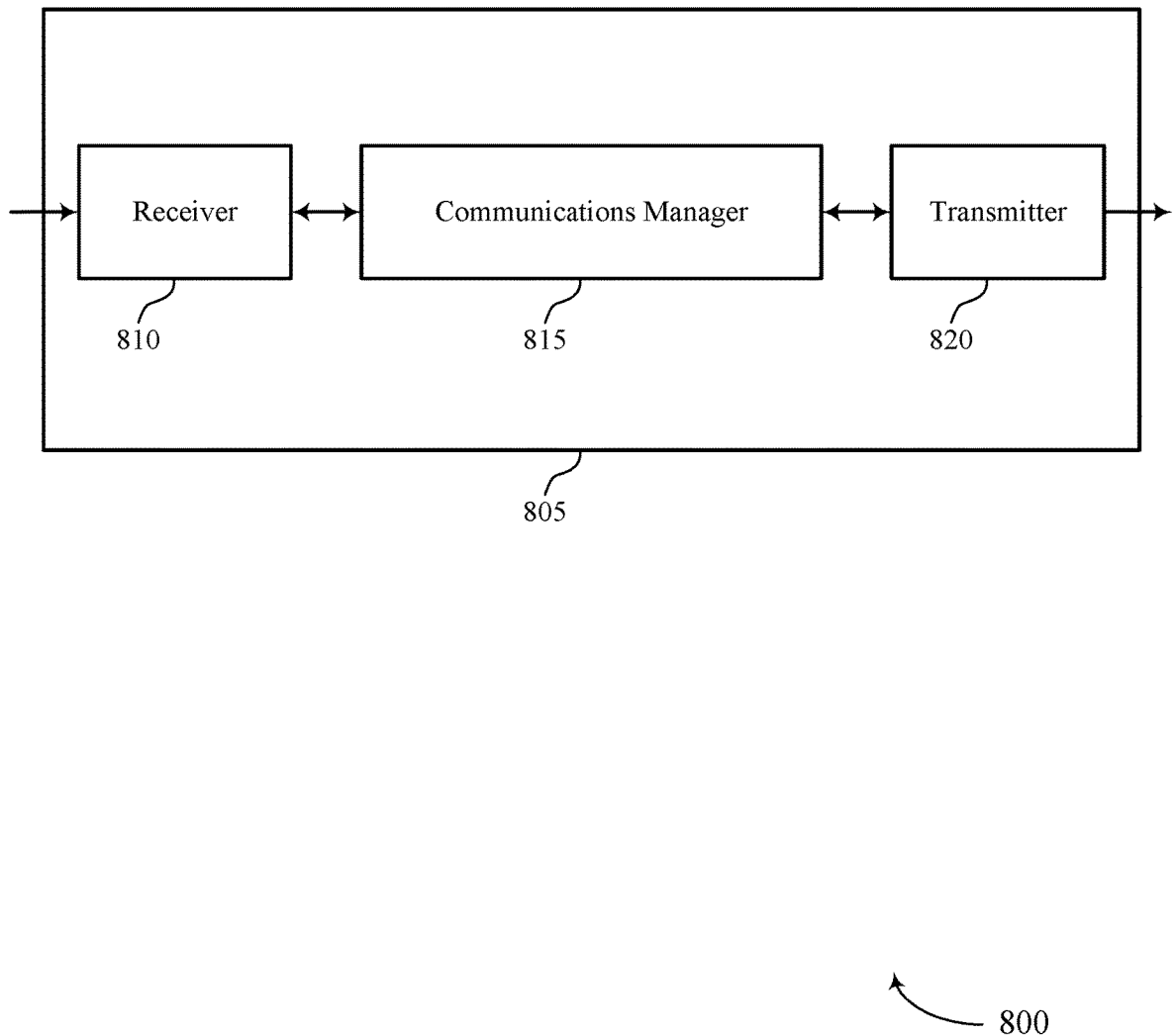
FIGS. 8 and 9 show block diagrams of devices that support preemption indication and permission indication management for MBB and low latency communication multiplexing in accordance with aspects of the present disclosure.

FIG. 8 shows a block diagram 800 of a device 805 that supports preemption indication and permission indication management for MBB and low latency communication multiplexing in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to preemption indication and permission indication management for MBB and low latency communication multiplexing, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a preemption monitoring indication in a grant in a first downlink control channel, where the grant is for an uplink or downlink transmission, and the preemption monitoring indication indicates whether the UE is to monitor a second downlink control channel for a preemption indication and determine, based on the preemption monitoring indication, whether to monitor the second downlink control channel for the preemption indication. The communications manager 815 may also receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, monitor for a preemption indication or a permission indication in a second downlink control channel based on the control message, receive an uplink grant in a first downlink control channel for an uplink transmission on the carrier to the base station, and transmit the uplink transmission on the carrier based on monitoring for the preemption indication or the permission indication. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
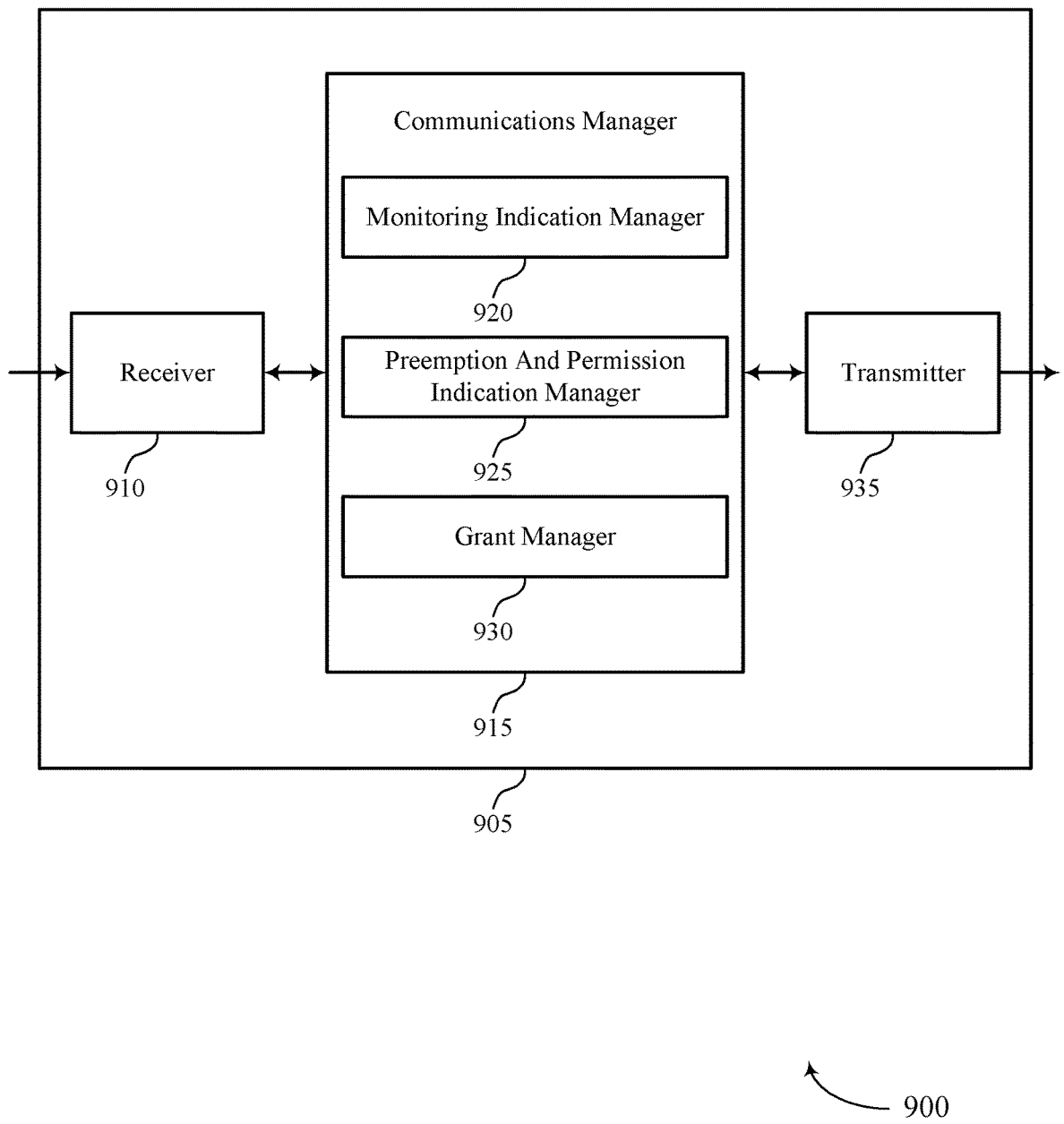

FIG. 9 shows a block diagram 900 of a device 905 that supports preemption indication and permission indication management for MBB and low latency communication multiplexing in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to preemption indication and permission indication management for MBB and low latency communication multiplexing, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a monitoring indication manager 920, a preemption and permission indication manager 925, and a grant manager 930. The communications manager 915 may be an example of aspects of the communications manager 1110 described herein.

The monitoring indication manager 920 may receive a preemption monitoring indication in a grant in a first downlink control channel, where the grant is for an uplink or downlink transmission, and the preemption monitoring indication indicates whether the UE is to monitor a second downlink control channel for a preemption indication. The preemption and permission indication manager 925 may determine, based on the preemption monitoring indication, whether to monitor the second downlink control channel for the preemption indication.

The preemption and permission indication manager 925 may receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission. The grant manager 930 may receive an uplink grant in a first downlink control channel for an uplink transmission on the carrier to the base station. The preemption and permission indication manager 925 may then monitor for a preemption indication or a permission indication in a second downlink control channel based on the control message. The communications manager 915 may then coordinate with transmitter 935 to transmit the uplink transmission on the carrier based on monitoring for the preemption indication or the permission indication.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
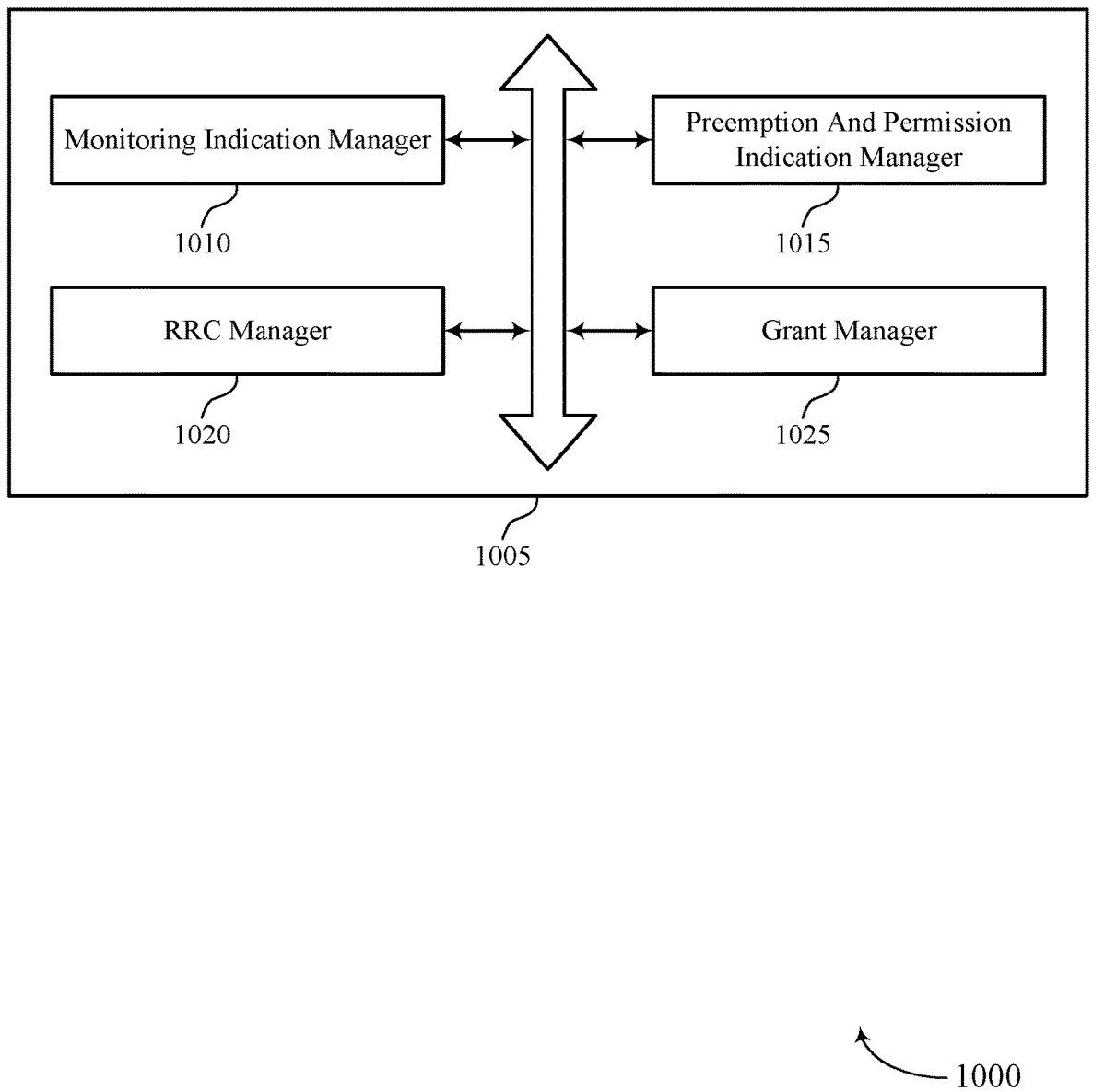
FIG. 10 shows a block diagram of a communications manager that supports preemption indication and permission indication management for MBB and low latency communication multiplexing in accordance with aspects of the present disclosure.

FIG. 10 shows a block diagram 1000 of a communications manager 1005 that supports preemption indication and permission indication management for MBB and low latency communication multiplexing in accordance with aspects of the present disclosure. The communications manager 1005 may be an example of aspects of a communications manager 815, a communications manager 915, or a communications manager 1110 described herein. The communications manager 1005 may include a monitoring indication manager 1010, a preemption and permission indication manager 1015, an RRC manager 1020, and a grant manager 1025. Each of these modules may communicate, directly or indirectly, with one another (e.g., via one or more buses).

The monitoring indication manager 1010 may receive a preemption monitoring indication in a grant in a first downlink control channel, where the grant is for an uplink or downlink transmission, and the preemption monitoring indication indicates whether the UE is to monitor a second downlink control channel for a preemption indication. The preemption and permission indication manager 1015 may determine, based on the preemption monitoring indication, whether to monitor the second downlink control channel for the preemption indication. The RRC manager 1020 may receive RRC signaling that configures the UE to monitor the first downlink control channel for the preemption monitoring indication.

In some examples, the preemption and permission indication manager 1015 may monitor the second downlink control channel for the preemption indication based on the preemption monitoring indication indicating that the UE is to monitor the second downlink control channel for the preemption indication, where the uplink or downlink transmission is allowed to be preempted by another transmission. In some examples, the preemption and permission indication manager 1015 may avoid monitoring the second downlink control channel for the preemption indication based on the preemption monitoring indication indicating that the UE is not to monitor the second downlink control channel for the preemption indication, where the uplink or downlink transmission is not allowed to be preempted by another transmission.

In some cases, the preemption monitoring indication is based on channel conditions or traffic conditions, a priority associated with the uplink or downlink transmission, an amount of DCI received by the UE and a decoding budget at the UE, or a combination thereof. In some cases, the preemption monitoring indication includes a one-bit field in DCI received in the first downlink control channel. In some cases, the uplink or downlink transmission includes an MBB transmission and the other transmission includes a low latency transmission. In some cases, the grant includes a SPS grant scheduling a sequence of transmissions, and the preemption monitoring indication indicates whether the UE is to monitor the second downlink control channel for preemption indications for the sequence of transmissions.

In some examples, the preemption and permission indication manager 1015 may receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission. The grant manager 1025 may receive an uplink grant in a first downlink control channel for an uplink transmission on the carrier to the base station. In some examples, the preemption and permission indication manager 1015 may monitor for a preemption indication or a permission indication in a second downlink control channel based on the control message. In some examples, the communications manager 1005 may coordinate with a transmitter to transmit the uplink transmission on the carrier based on monitoring for the preemption indication or the permission indication.

In some examples, the preemption and permission indication manager 1015 may determine that the control message indicates that the UE is to interpret future indications received from the base station and pertaining to the uplink transmissions on the carrier as preemption indications. In some examples, the preemption and permission indication manager 1015 may receive a preemption indication in accordance with the control message indicating that the uplink transmission is to be preempted by another transmission. In some examples, the communications manager 1005 may coordinate with a transmitter to drop at least a portion of the uplink transmission based on receiving the preemption indication.

In some examples, the preemption and permission indication manager 1015 may determine that the control message indicates that the UE is to interpret future indications received from the base station and pertaining to the uplink transmissions on the carrier as preemption indications. In some examples, the preemption and permission indication manager 1015 may fail to receive a preemption indication in accordance with the control message indicating that the uplink transmission is to be preempted by another transmission. In some examples, the communications manager 1005 may coordinate with a transmitter to transmit an entirety of the uplink transmission based on failing to receive the preemption indication.

In some examples, the preemption and permission indication manager 1015 may determine that the control message indicates that the UE is to interpret future indications received from the base station and pertaining to the uplink transmissions on the carrier as permission indications. In some examples, the preemption and permission indication manager 1015 may receive a permission indication in accordance with the control message indicating that the UE has permission to transmit the uplink transmission. In some examples, the communications manager 1005 may coordinate with a transmitter to transmit the uplink transmission based on receiving the permission indication.

In some examples, the preemption and permission indication manager 1015 may determine that the control message indicates that the UE is to interpret future indications received from the base station and pertaining to the uplink transmissions on the carrier as permission indications. In some examples, the preemption and permission indication manager 1015 may fail to receive a permission indication in accordance with the control message indicating that the UE has permission to transmit the uplink transmission. In some examples, the communications manager 1005 may coordinate with a transmitter to drop the uplink transmission based on failing to receive the permission indication.

In some examples, the monitoring indication manager 1010 may receive a monitoring indication in the uplink grant indicating whether the UE is to monitor the second downlink control channel for the preemption indication or the permission indication, the monitoring indication being based on whether the uplink transmission is allowed to be preempted by another transmission. In some examples, the preemption and permission indication manager 1015 may monitor for the preemption indication or the permission indication in accordance with the monitoring indication.

In some examples, the preemption and permission indication manager 1015 may monitor the second downlink control channel for the preemption indication or the permission indication based on the monitoring indication indicating that the UE is to monitor the second downlink control channel for the preemption indication or the permission indication. In some examples, the preemption and permission indication manager 1015 may avoid monitoring the second downlink control channel for the preemption indication or the permission indication based on the monitoring indication indicating that the UE is not to monitor the second downlink control channel for the preemption indication or the permission indication.

In some examples, the communications manager 1005 may coordinate with a transmitter to transmit the uplink transmission on the carrier regardless of whether the control message indicates that the UE is to interpret future indications received from the base station and pertaining to uplink transmission on the carrier as preemption indications or permission indications. In some cases, the indication of whether the UE is to interpret future indications received from the base station and pertaining to the uplink transmission on the carrier as either preemption indications or permission indications is based on a probability of collisions between the uplink transmissions and other transmissions. In some cases, the uplink transmissions include MBB transmissions and the other transmissions include low latency transmissions. In some cases, the control message includes an RRC message. In some cases, preemption indications and permission indications are received in DCI messages having a same format.

Figure 11:
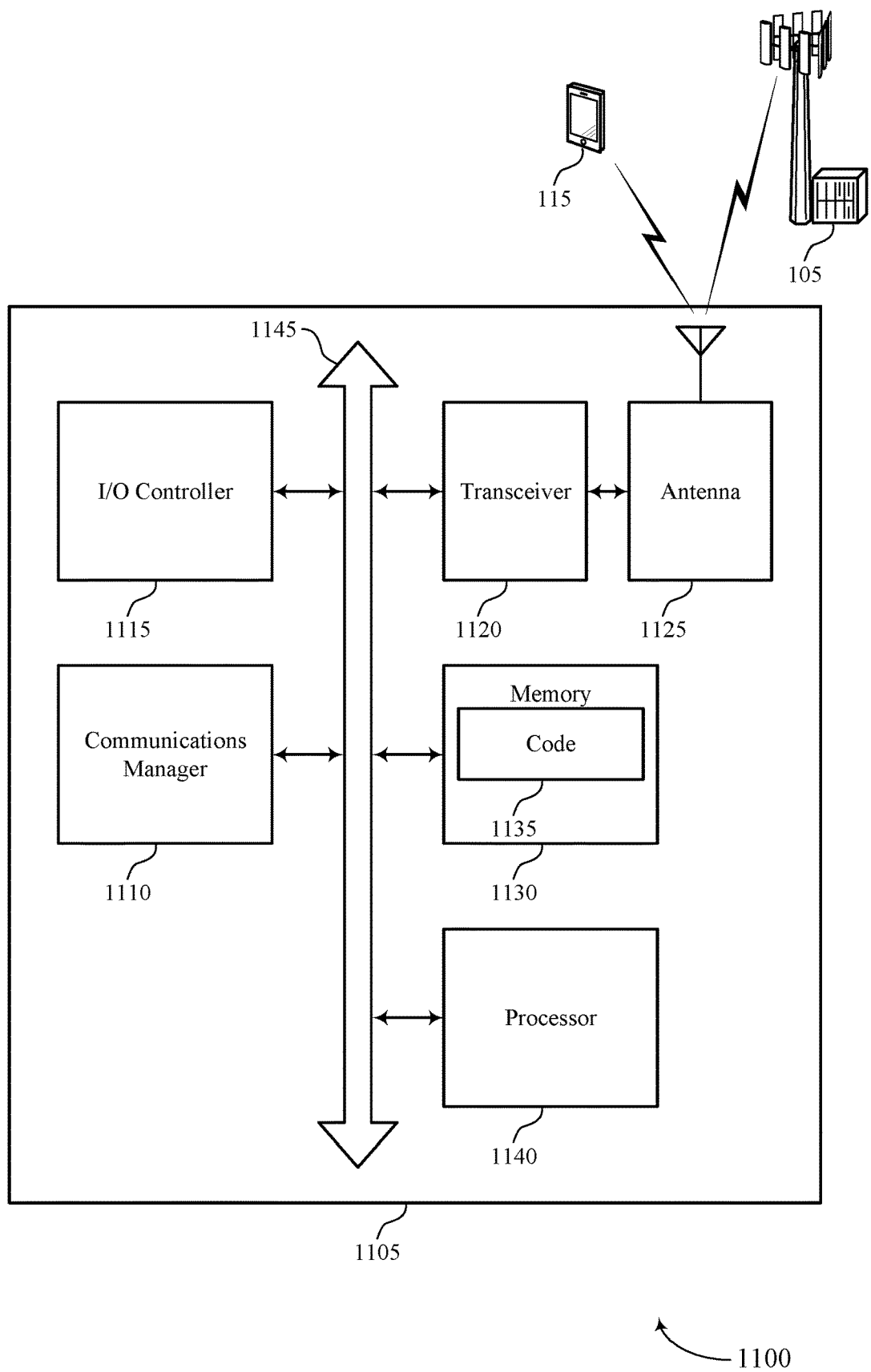
FIG. 11 shows a diagram of a system including a device that supports preemption indication and permission indication management for MBB and low latency communication multiplexing in accordance with aspects of the present disclosure.

FIG. 11 shows a diagram of a system 1100 including a device 1105 that supports preemption indication and permission indication management for MBB and low latency communication multiplexing in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a preemption monitoring indication in a grant in a first downlink control channel, where the grant is for an uplink or downlink transmission, and the preemption monitoring indication indicates whether the UE is to monitor a second downlink control channel for a preemption indication and determine, based on the preemption monitoring indication, whether to monitor the second downlink control channel for the preemption indication. The communications manager 1110 may also receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission, monitor for a preemption indication or a permission indication in a second downlink control channel based on the control message, receive an uplink grant in a first downlink control channel for an uplink transmission on the carrier to the base station, and transmit the uplink transmission on the carrier based on monitoring for the preemption indication or the permission indication.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting preemption indication and permission indication management for MBB and low latency communication multiplexing).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
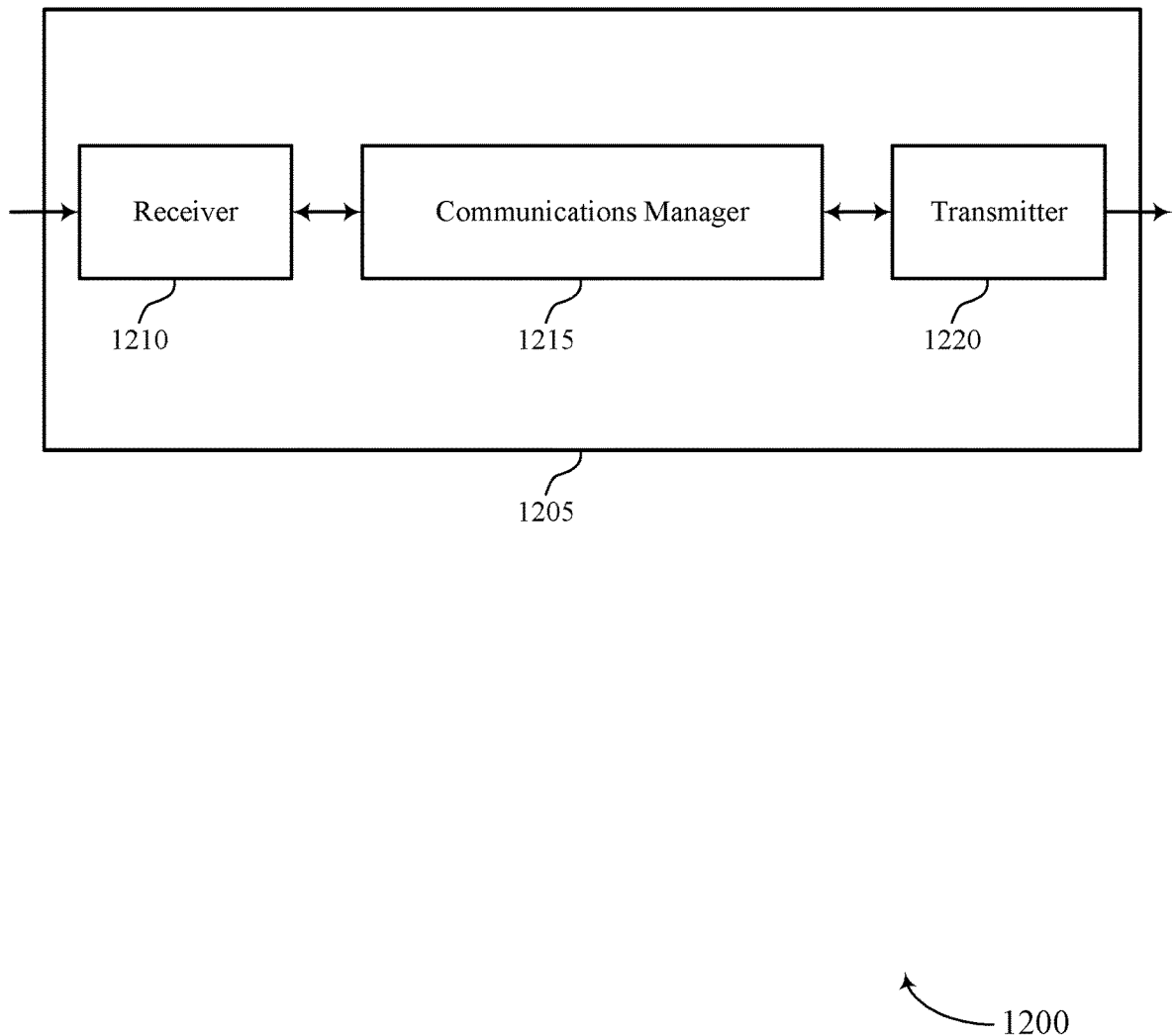
FIGS. 12 and 13 show block diagrams of devices that support preemption indication and permission indication management for MBB and low latency communication multiplexing in accordance with aspects of the present disclosure.

FIG. 12 shows a block diagram 1200 of a device 1205 that supports preemption indication and permission indication management for MBB and low latency communication multiplexing in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to preemption indication and permission indication management for MBB and low latency communication multiplexing, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify an uplink transmission from a UE or a downlink transmission to the UE to be scheduled, determine whether to configure the UE to monitor for a preemption indication associated with the uplink or downlink transmission based on whether the uplink or downlink transmission is allowed to be preempted by another transmission, and transmit a grant in a first downlink control channel, the grant being for the uplink or downlink transmission and including a preemption monitoring indication indicating whether the UE is to monitor a second downlink control channel for the preemption indication based on the determination.

The communications manager 1215 may also identify a carrier to be used for uplink transmissions from a UE, determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmit a control message indicating whether future indications transmitted to the UE and pertaining to the uplink transmissions on the carrier are to be interpreted as preemption indications or permission indications based on the determination. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
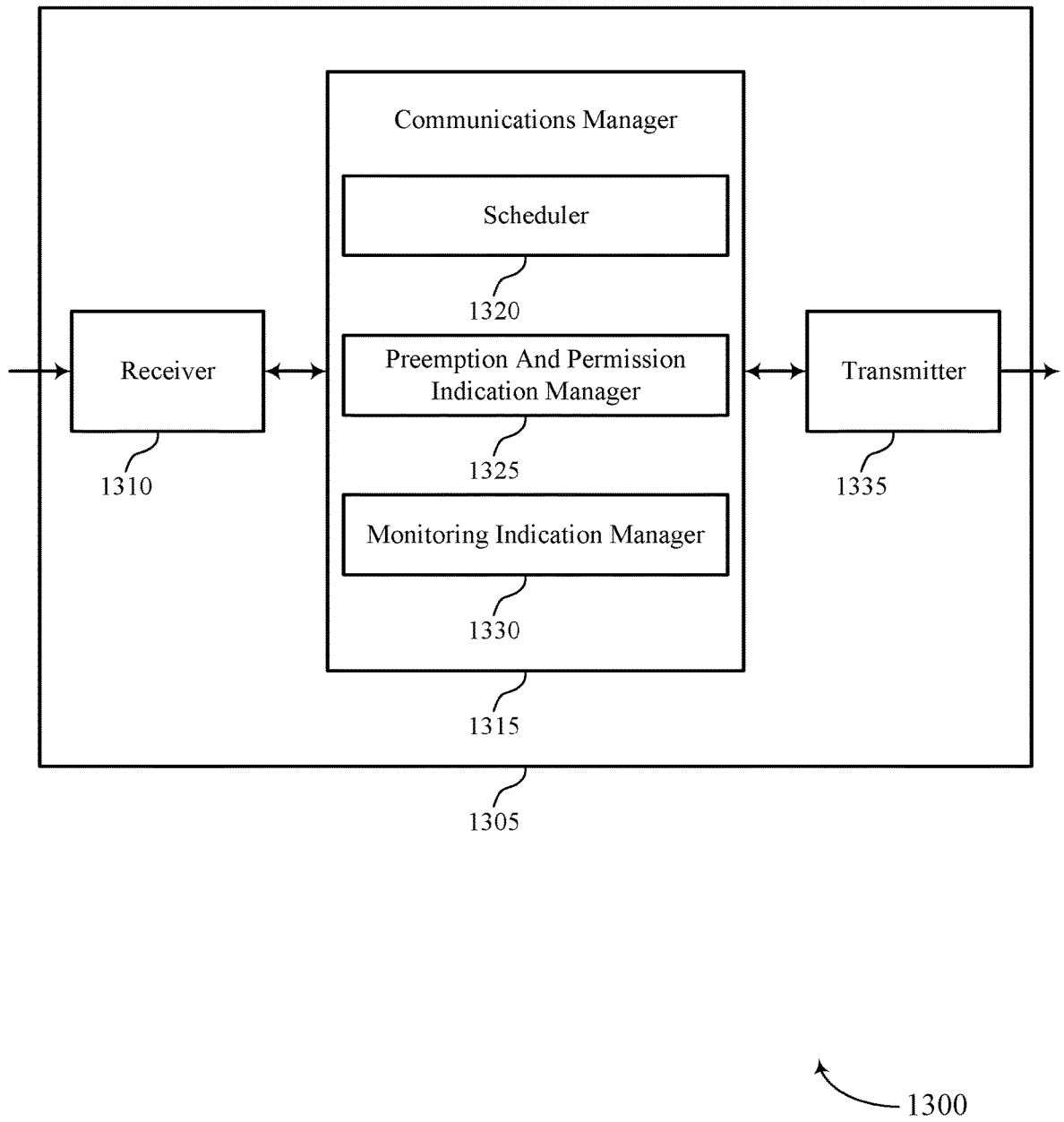

FIG. 13 shows a block diagram 1300 of a device 1305 that supports preemption indication and permission indication management for MBB and low latency communication multiplexing in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to preemption indication and permission indication management for MBB and low latency communication multiplexing, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a scheduler 1320, a preemption and permission indication manager 1325, and a monitoring indication manager 1330. The communications manager 1315 may be an example of aspects of the communications manager 1510 described herein.

The scheduler 1320 may identify an uplink transmission from a UE or a downlink transmission to the UE to be scheduled. The preemption and permission indication manager 1325 may determine whether to configure the UE to monitor for a preemption indication associated with the uplink or downlink transmission based on whether the uplink or downlink transmission is allowed to be preempted by another transmission. The monitoring indication manager 1330 may transmit a grant in a first downlink control channel, the grant being for the uplink or downlink transmission and including a preemption monitoring indication indicating whether the UE is to monitor a second downlink control channel for the preemption indication based on the determination.

The scheduler 1320 may identify a carrier to be used for uplink transmissions from a UE. The preemption and permission indication manager 1325 may determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission. The preemption and permission indication manager 1325 may then transmit a control message indicating whether future indications transmitted to the UE and pertaining to the uplink transmissions on the carrier are to be interpreted as preemption indications or permission indications based on the determination.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
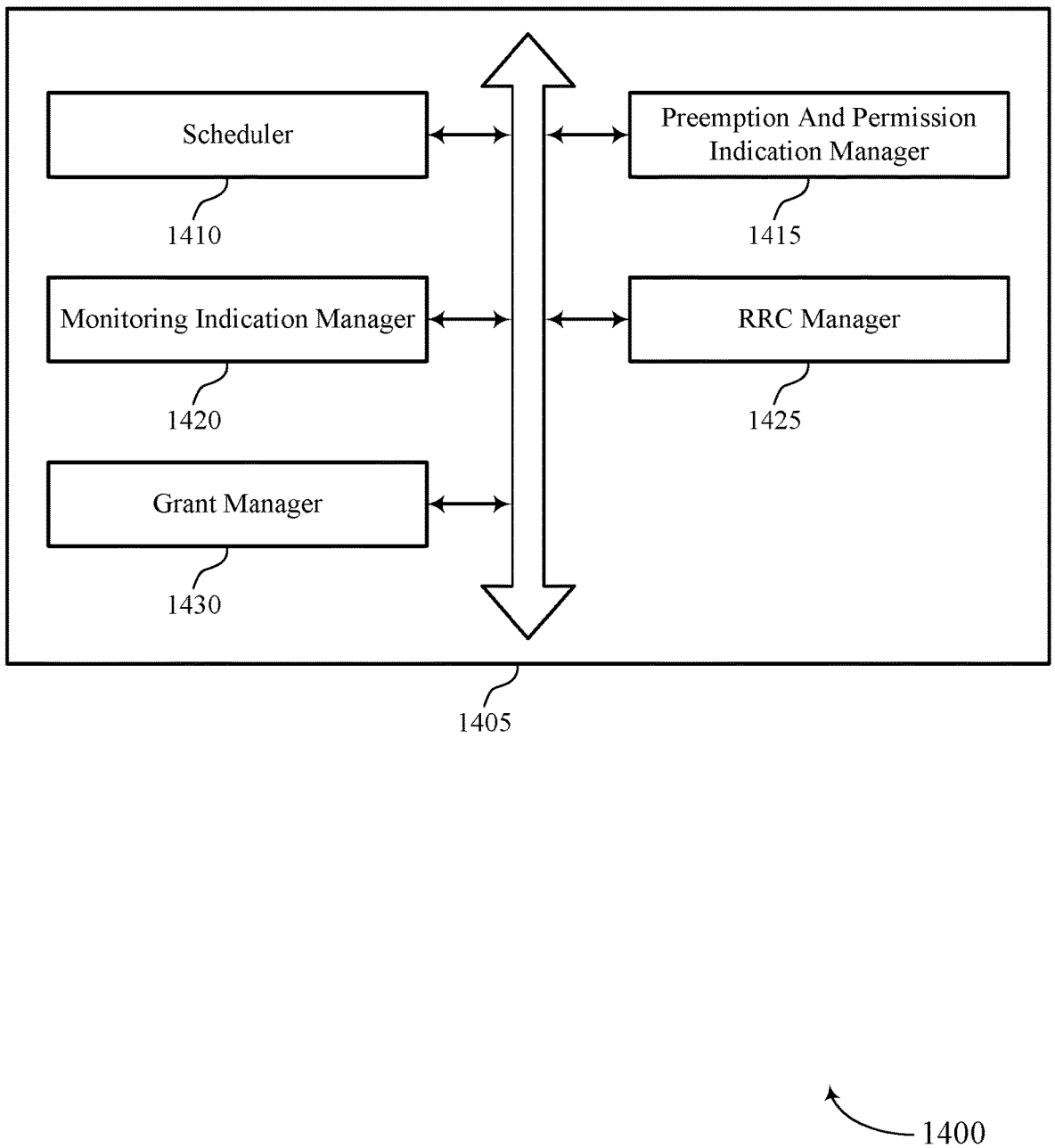
FIG. 14 shows a block diagram of a communications manager that supports preemption indication and permission indication management for MBB and low latency communication multiplexing in accordance with aspects of the present disclosure.

FIG. 14 shows a block diagram 1400 of a communications manager 1405 that supports preemption indication and permission indication management for MBB and low latency communication multiplexing in accordance with aspects of the present disclosure. The communications manager 1405 may be an example of aspects of a communications manager 1215, a communications manager 1315, or a communications manager 1510 described herein. The communications manager 1405 may include a scheduler 1410, a preemption and permission indication manager 1415, a monitoring indication manager 1420, an RRC manager 1425, and a grant manager 1430. Each of these modules may communicate, directly or indirectly, with one another (e.g., via one or more buses).

The scheduler 1410 may identify an uplink transmission from a UE or a downlink transmission to the UE to be scheduled. The preemption and permission indication manager 1415 may determine whether to configure the UE to monitor for a preemption indication associated with the uplink or downlink transmission based on whether the uplink or downlink transmission is allowed to be preempted by another transmission. The monitoring indication manager 1420 may transmit a grant in a first downlink control channel, the grant being for the uplink or downlink transmission and including a preemption monitoring indication indicating whether the UE is to monitor a second downlink control channel for the preemption indication based on the determination. The RRC manager 1425 may transmit RRC signaling that configures the UE to monitor the first downlink control channel for the preemption monitoring indication.

In some examples, the scheduler 1410 may identify another transmission to be scheduled on resources allocated for the uplink or downlink transmission. In some examples, the preemption and permission indication manager 1415 may transmit the preemption indication in the second downlink control channel indicating that the uplink or downlink transmission is to be preempted for the other transmission based on the preemption monitoring indication indicating that the UE is to monitor the second downlink control channel for the preemption indication. In some examples, the preemption and permission indication manager 1415 may determine whether to configure the UE to monitor for the preemption indication based on channel conditions or traffic conditions, a priority associated with the uplink or downlink transmission, an amount of DCI transmitted to the UE and a decoding budget at the UE, or a combination thereof.

In some cases, the preemption monitoring indication includes a one-bit field in DCI transmitted in the first downlink control channel. In some cases, the uplink or downlink transmission includes an MBB transmission and the other transmission includes a low latency transmission. In some cases, the grant includes a SPS grant scheduling a sequence of transmissions, and the preemption monitoring indication indicates whether the UE is to monitor the second downlink control channel for preemption indications for the sequence of transmissions.

In some examples, the scheduler 1410 may identify a carrier to be used for uplink transmissions from a UE. In some examples, the preemption and permission indication manager 1415 may determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission. In some examples, the preemption and permission indication manager 1415 may transmit a control message indicating whether future indications transmitted to the UE and pertaining to the uplink transmissions on the carrier are to be interpreted as preemption indications or permission indications based on the determination.

In some examples, the preemption and permission indication manager 1415 may determine to transmit preemption indications pertaining to the uplink transmissions on the carrier. The grant manager 1430 may transmit an uplink grant in a first downlink control channel for an uplink transmission on the carrier from the UE. In some examples, the preemption and permission indication manager 1415 may transmit a preemption indication indicating that the uplink transmission is to be preempted for another transmission. In some examples, the communications manager 1405 may fail to receive at least a portion of the uplink transmission based on transmitting the preemption indication.

In some examples, the preemption and permission indication manager 1415 may determine to transmit preemption indications pertaining to the uplink transmissions on the carrier. The grant manager 1430 may transmit an uplink grant in a first downlink control channel for an uplink transmission on the carrier from the UE. In some examples, the preemption and permission indication manager 1415 may avoid transmitting a preemption indication indicating that the uplink transmission is to be preempted for another transmission. In some examples, the communications manager 1405 may receive an entirety of the uplink transmission based on the avoiding.

In some examples, the preemption and permission indication manager 1415 may determine to transmit permission indications pertaining to the uplink transmissions on the carrier. The grant manager 1430 may transmit an uplink grant in a first downlink control channel for an uplink transmission on the carrier from the UE. In some examples, the preemption and permission indication manager 1415 may transmit a permission indication indicating that the UE has permission to transmit the uplink transmission. In some examples, the communications manager 1405 may receive the uplink transmission based on transmitting the permission indication.

In some examples, the preemption and permission indication manager 1415 may determine to transmit permission indications pertaining to the uplink transmissions on the carrier. The grant manager 1430 may transmit an uplink grant in a first downlink control channel for an uplink transmission on the carrier from the UE. In some examples, the preemption and permission indication manager 1415 may avoid transmitting a permission indication indicating that the UE has permission to transmit the uplink transmission. In some examples, the communications manager 1405 may fail to receive the uplink transmission based on the avoiding.

In some examples, the monitoring indication manager 1420 may transmit a monitoring indication in an uplink grant indicating whether the UE is to monitor for a preemption indication or a permission indication pertaining to an uplink transmission, the monitoring indication being based on whether the uplink transmission is allowed to be preempted by another transmission. In some examples, the preemption and permission indication manager 1415 may determine whether to transmit preemption indications or permission indications pertaining to the uplink transmissions on the carrier based on a probability of collisions between the uplink transmissions and other transmissions.

In some examples, the preemption and permission indication manager 1415 may determine that the probability of collisions between the uplink transmissions and the other transmissions is above a threshold. In some examples, the preemption and permission indication manager 1415 may determine to transmit permission indications pertaining to the uplink transmissions on the carrier. In some examples, the preemption and permission indication manager 1415 may determine that the probability of collisions between the uplink transmissions and the other transmissions is below a threshold. In some examples, the preemption and permission indication manager 1415 may determine to transmit preemption indications pertaining to the uplink transmissions on the carrier.

In some cases, the uplink transmissions include MBB transmissions and the other transmissions include low latency transmissions. In some cases, the control message includes an RRC message. In some cases, preemption indications and permission indications are transmitted in DCI messages having a same format.

Figure 15:
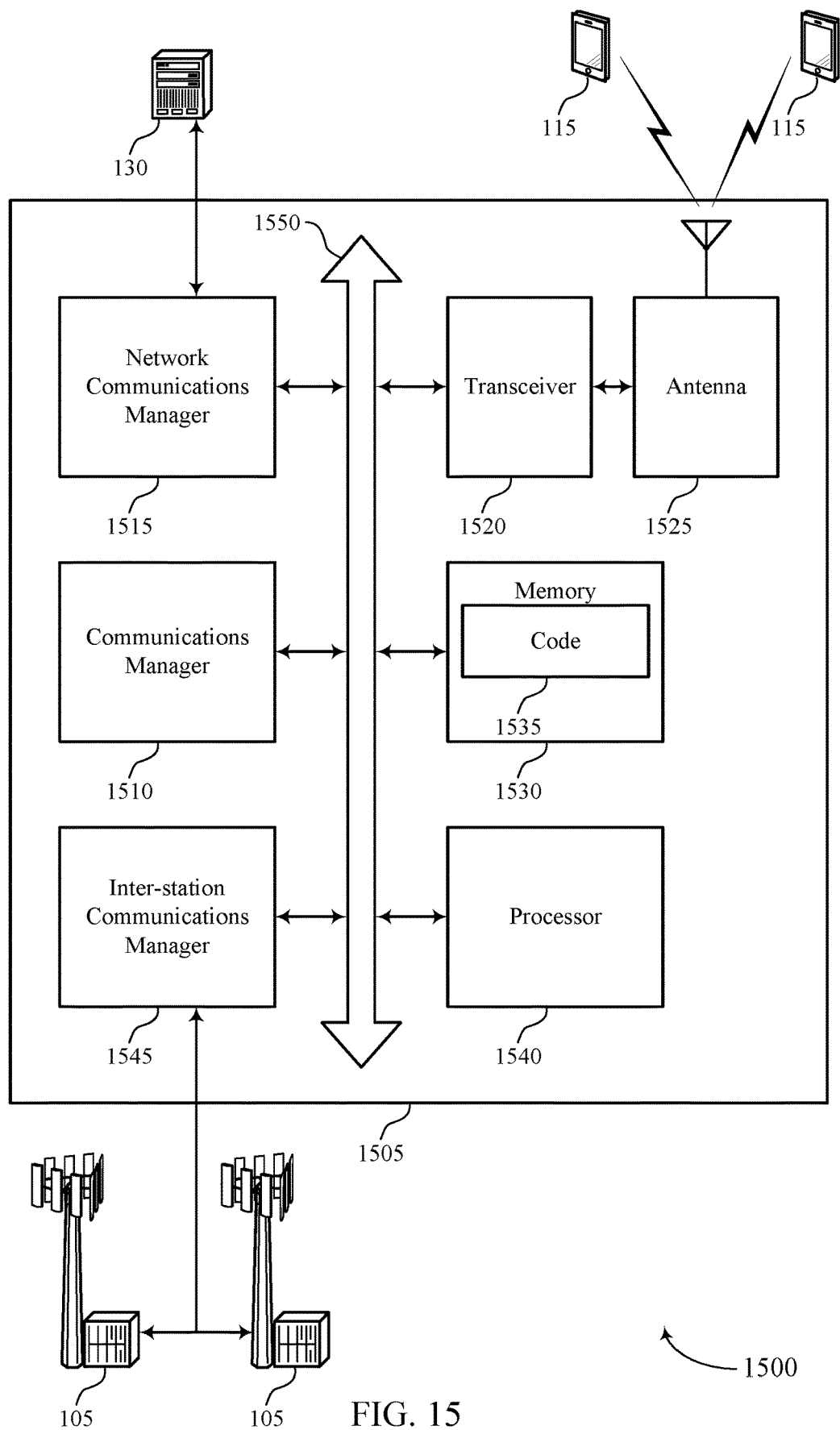
FIG. 15 shows a diagram of a system including a device that supports preemption indication and permission indication management for MBB and low latency communication multiplexing in accordance with aspects of the present disclosure.

FIG. 15 shows a diagram of a system 1500 including a device 1505 that supports preemption indication and permission indication management for MBB and low latency communication multiplexing in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify an uplink transmission from a UE or a downlink transmission to the UE to be scheduled, determine whether to configure the UE to monitor for a preemption indication associated with the uplink or downlink transmission based on whether the uplink or downlink transmission is allowed to be preempted by another transmission, and transmit a grant in a first downlink control channel, the grant being for the uplink or downlink transmission and including a preemption monitoring indication indicating whether the UE is to monitor a second downlink control channel for the preemption indication based on the determination.

The communications manager 1510 may also identify a carrier to be used for uplink transmissions from a UE, determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission, and transmit a control message indicating whether future indications transmitted to the UE and pertaining to the uplink transmissions on the carrier are to be interpreted as preemption indications or permission indications based on the determination.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting preemption indication and permission indication management for MBB and low latency communication multiplexing).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
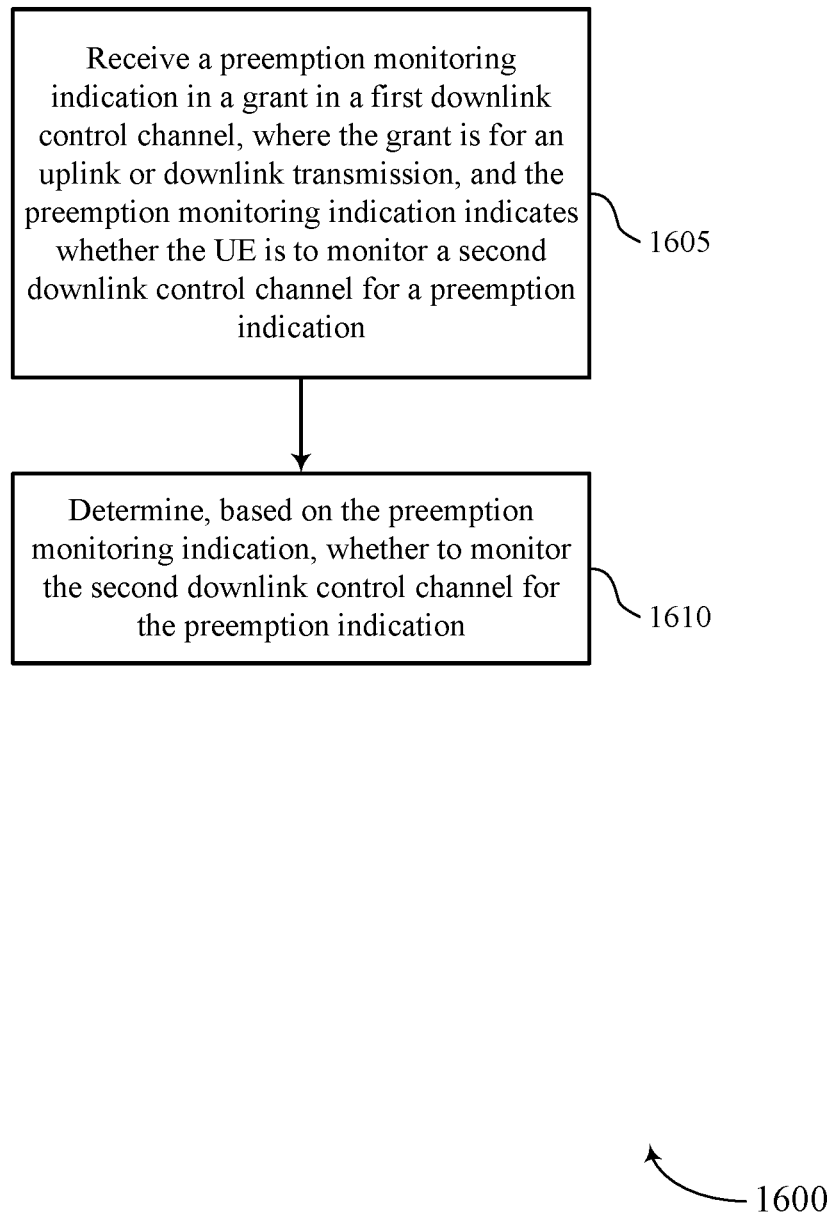
FIGS. 16-19 show flowcharts illustrating methods that support preemption indication and permission indication management for MBB and low latency communication multiplexing in accordance with aspects of the present disclosure.

FIG. 16 shows a flowchart illustrating a method 1600 that supports preemption indication and permission indication management for MBB and low latency communication multiplexing in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive a preemption monitoring indication in a grant in a first downlink control channel, where the grant is for an uplink or downlink transmission, and the preemption monitoring indication indicates whether the UE is to monitor a second downlink control channel for a preemption indication. The operations of 1605 may be performed according to the methods described herein. In some examples, aspects of the operations of 1605 may be performed by a monitoring indication manager as described with reference to FIGS. 8 through 11.

At 1610, the UE may determine, based on the preemption monitoring indication, whether to monitor the second downlink control channel for the preemption indication. The operations of 1610 may be performed according to the methods described herein. In some examples, aspects of the operations of 1610 may be performed by a preemption and permission indication manager as described with reference to FIGS. 8 through 11.

Figure 17:
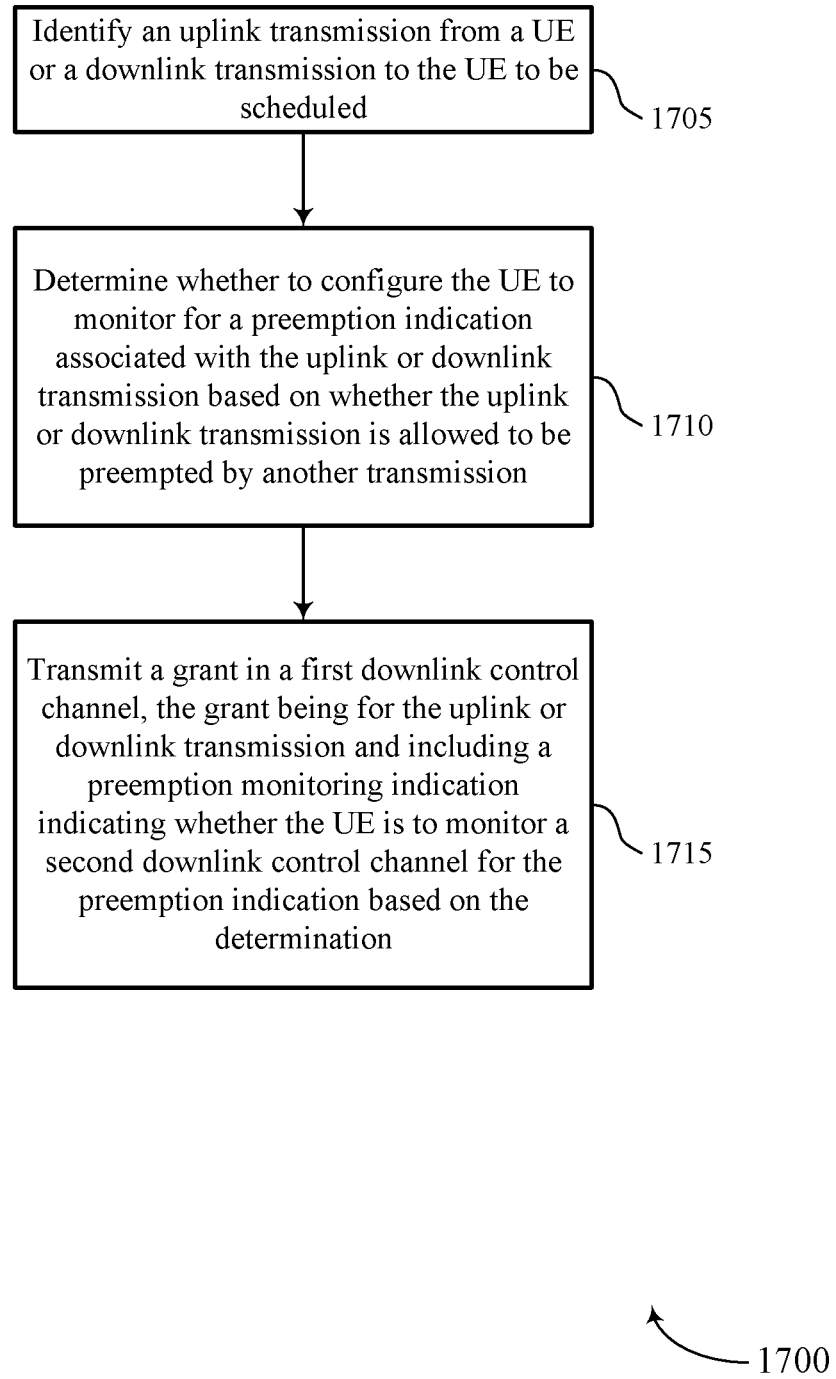

FIG. 17 shows a flowchart illustrating a method 1700 that supports preemption indication and permission indication management for MBB and low latency communication multiplexing in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station may identify an uplink transmission from a UE or a downlink transmission to the UE to be scheduled. The operations of 1705 may be performed according to the methods described herein. In some examples, aspects of the operations of 1705 may be performed by a scheduler as described with reference to FIGS. 12 through 15.

At 1710, the base station may determine whether to configure the UE to monitor for a preemption indication associated with the uplink or downlink transmission based on whether the uplink or downlink transmission is allowed to be preempted by another transmission. The operations of 1710 may be performed according to the methods described herein. In some examples, aspects of the operations of 1710 may be performed by a preemption and permission indication manager as described with reference to FIGS. 12 through 15.

At 1715, the base station may transmit a grant in a first downlink control channel, the grant being for the uplink or downlink transmission and including a preemption monitoring indication indicating whether the UE is to monitor a second downlink control channel for the preemption indication based on the determination. The operations of 1715 may be performed according to the methods described herein. In some examples, aspects of the operations of 1715 may be performed by a monitoring indication manager as described with reference to FIGS. 12 through 15.

Figure 18:
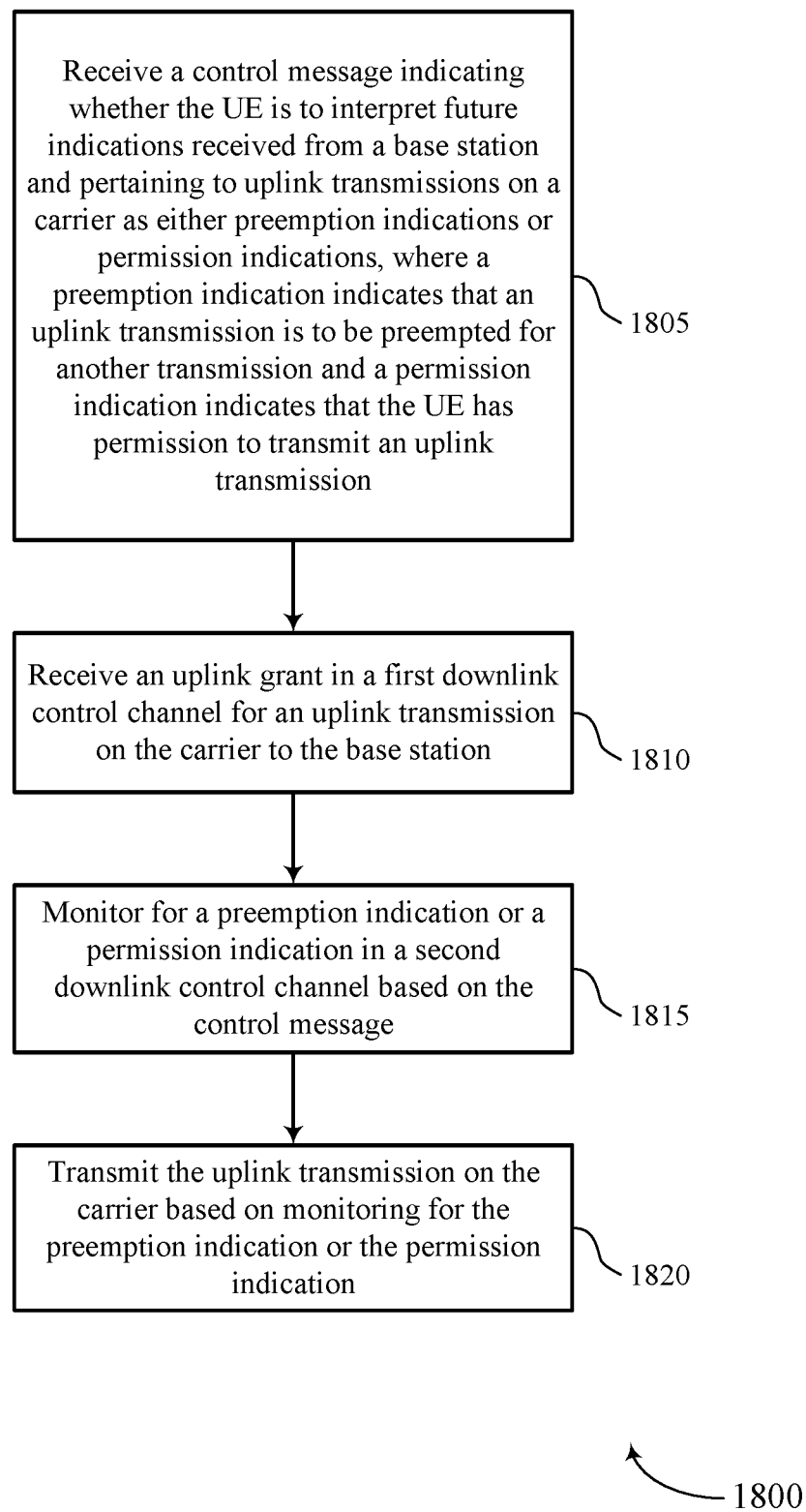

FIG. 18 shows a flowchart illustrating a method 1800 that supports preemption indication and permission indication management for MBB and low latency communication multiplexing in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1805, the UE may receive a control message indicating whether the UE is to interpret future indications received from a base station and pertaining to uplink transmissions on a carrier as either preemption indications or permission indications, where a preemption indication indicates that an uplink transmission is to be preempted for another transmission and a permission indication indicates that the UE has permission to transmit an uplink transmission. The operations of 1805 may be performed according to the methods described herein. In some examples, aspects of the operations of 1805 may be performed by a preemption and permission indication manager as described with reference to FIGS. 8 through 11.

At 1810, the UE may receive an uplink grant in a first downlink control channel for an uplink transmission on the carrier to the base station. The operations of 1810 may be performed according to the methods described herein. In some examples, aspects of the operations of 1810 may be performed by a grant manager as described with reference to FIGS. 8 through 11.

At 1815, the UE may monitor for a preemption indication or a permission indication in a second downlink control channel based on the control message. The operations of 1815 may be performed according to the methods described herein. In some examples, aspects of the operations of 1815 may be performed by a preemption and permission indication manager as described with reference to FIGS. 8 through 11.

At 1820, the UE may transmit the uplink transmission on the carrier based on monitoring for the preemption indication or the permission indication. The operations of 1820 may be performed according to the methods described herein. In some examples, aspects of the operations of 1820 may be performed by a grant manager as described with reference to FIGS. 8 through 11.

Figure 19:
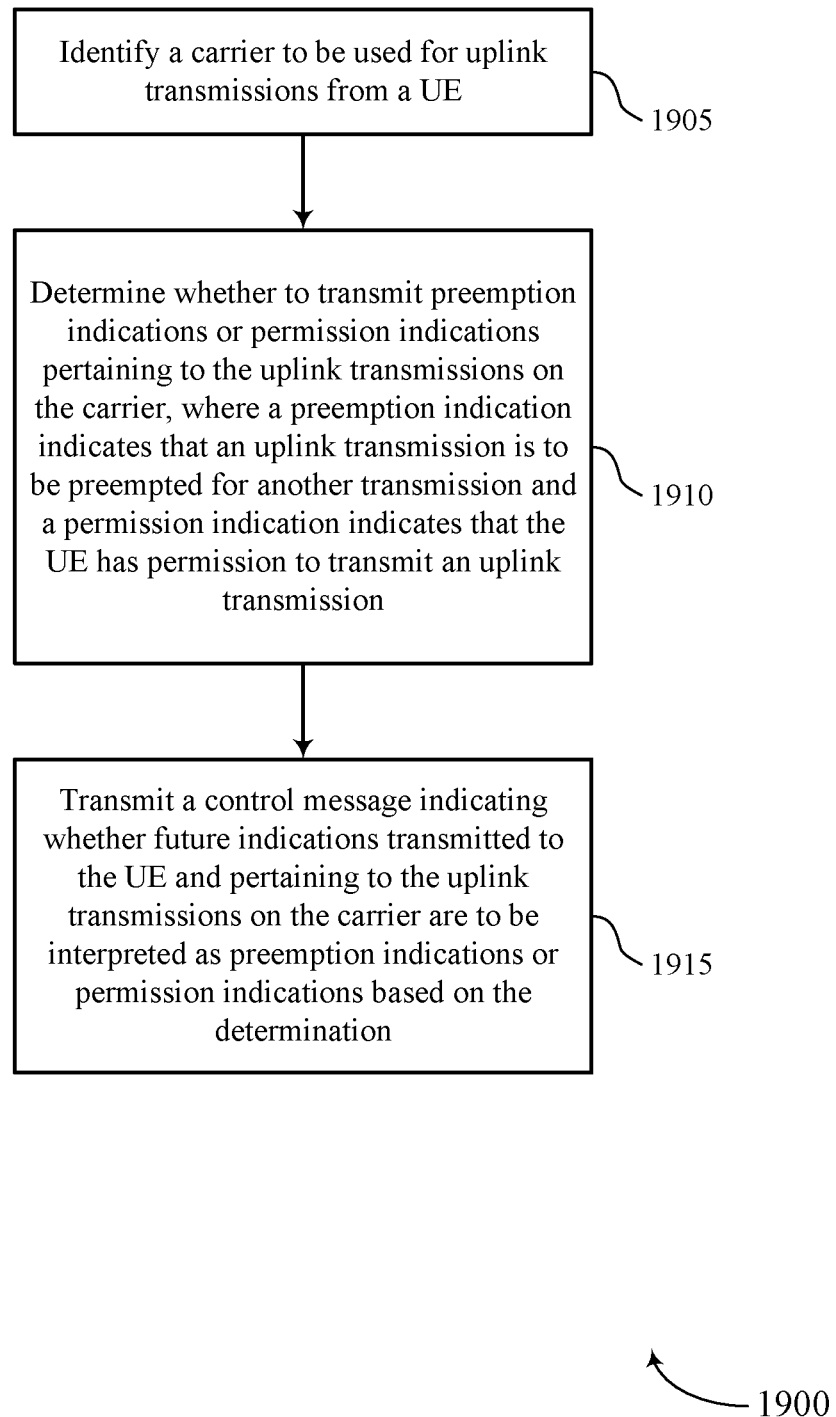

FIG. 19 shows a flowchart illustrating a method 1900 that supports preemption indication and permission indication management for MBB and low latency communication multiplexing in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1905, the base station may identify a carrier to be used for uplink transmissions from a UE. The operations of 1905 may be performed according to the methods described herein. In some examples, aspects of the operations of 1905 may be performed by a scheduler as described with reference to FIGS. 12 through 15.

At 1910, the base station may determine whether to transmit preemption indications or permission indications pertaining to the uplink transmissions on the carrier, where a preemption indication indicates that an uplink transmission is to be preempted for another transmission and a permission indication indicates that the UE has permission to transmit an uplink transmission. The operations of 1910 may be performed according to the methods described herein. In some examples, aspects of the operations of 1910 may be performed by a preemption and permission indication manager as described with reference to FIGS. 12 through 15.

At 1915, the base station may transmit a control message indicating whether future indications transmitted to the UE and pertaining to the uplink transmissions on the carrier are to be interpreted as preemption indications or permission indications based on the determination. The operations of 1915 may be performed according to the methods described herein. In some examples, aspects of the operations of 1915 may be performed by a preemption and permission indication manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
     receive a preemption monitoring indication in a grant of resources for an uplink transmission, wherein the grant is received on a first downlink control channel, and the preemption monitoring indication indicates whether the uplink transmission is permitted to be preempted by a preemption indication received on a second downlink control channel and wherein the preemption monitoring indication is indicative of a priority associated with the uplink transmission;
     monitor the second downlink control channel for the preemption indication; and
     cancel the uplink transmission based at least in part on the preemption monitoring indication and a result of the monitoring.

2. The apparatus of claim 1, wherein the instructions are further executable by the processor to cause the apparatus to:
   receive radio resource control (RRC) signaling that configures the UE to monitor the first downlink control channel for the preemption monitoring indication.

3. The apparatus of claim 1, wherein the instructions are further executable by the processor to cause the apparatus to:
   monitor the second downlink control channel for the preemption indication based at least in part on the preemption monitoring indication indicating that the UE is to monitor the second downlink control channel for the preemption indication, wherein the uplink transmission is allowed to be preempted by another transmission.

4. The apparatus of claim 1, wherein the preemption monitoring indication is based at least in part on channel conditions or traffic conditions, an amount of downlink control information (DCI) received by the UE and a decoding budget at the UE, or a combination thereof.

5. The apparatus of claim 1, wherein the preemption monitoring indication comprises a one-bit field in downlink control information (DCI) received in the first downlink control channel.

6. The apparatus of claim 1, wherein the uplink transmission comprises a mobile broadband (MBB) transmission and another transmission associated with the preemption indication that comprises a low latency transmission.

7. The apparatus of claim 1, wherein the grant comprises a semi-persistent scheduling (SPS) grant scheduling a sequence of transmissions, and the preemption monitoring indication indicates whether one or more of the sequence of transmissions may be preempted by the preemption indication.

8. A method for wireless communication at a user equipment (UE), comprising:
   receiving a preemption monitoring indication in a grant of resources for an uplink transmission, wherein the grant is received on a first downlink control channel, and the preemption monitoring indication indicates whether the uplink transmission is permitted to be preempted by a preemption indication received on a second downlink control channel and wherein the preemption monitoring indication is indicative of a priority associated with the uplink transmission;
   monitoring the second downlink control channel for the preemption indication; and
   canceling the uplink transmission based at least in part on the preemption monitoring indication and a result of the monitoring.

9. The method of claim 8, further comprising:
   receiving radio resource control (RRC) signaling that configures the UE to monitor the first downlink control channel for the preemption monitoring indication.

10. The method of claim 8, further comprising:
    monitoring the second downlink control channel for the preemption indication based at least in part on the preemption monitoring indication indicating that the UE is to monitor the second downlink control channel for the preemption indication, wherein the uplink transmission is allowed to be preempted by another transmission.

11. The method of claim 8, wherein the preemption monitoring indication is based at least in part on channel conditions or traffic conditions, an amount of downlink control information (DCI) received by the UE and a decoding budget at the UE, or a combination thereof.

12. The method of claim 8, wherein the preemption monitoring indication comprises a one-bit field in downlink control information (DCI) received in the first downlink control channel.

13. The method of claim 8, wherein the uplink transmission comprises a mobile broadband (MBB) transmission and another transmission associated with the preemption indication that comprises a low latency transmission.

14. The method of claim 8, wherein the grant comprises a semi-persistent scheduling (SPS) grant scheduling a sequence of transmissions, and the preemption monitoring indication indicates whether one or more of the sequence of transmissions may be preempted by the preemption indication.

15. An apparatus for wireless communication at a user equipment (UE), comprising:
    means for receiving a preemption monitoring indication in a grant of resources for an uplink transmission, wherein the grant is received on a first downlink control channel, and the preemption monitoring indication indicates whether the uplink transmission is permitted to be preempted by a preemption indication received on a second downlink control channel and wherein the preemption monitoring indication is indicative of a priority associated with the uplink transmission;

means for monitoring the second downlink control channel for the preemption indication; and means for canceling the uplink transmission based at least in part on the preemption monitoring indication and a result of the monitoring.

16. The apparatus of claim 15, further comprising:
means for receiving radio resource control (RRC) signaling that configures the UE to monitor the first downlink control channel for the preemption monitoring indication.

17. The apparatus of claim 15, further comprising:
means for monitoring the second downlink control channel for the preemption indication based at least in part on the preemption monitoring indication indicating that the UE is to monitor the second downlink control channel for the preemption indication, wherein the uplink transmission is allowed to be preempted by another transmission.

18. The apparatus of claim 15, wherein the preemption monitoring indication is based at least in part on channel conditions or traffic conditions, an amount of downlink control information (DCI) received by the UE and a decoding budget at the UE, or a combination thereof.

19. The apparatus of claim 15, wherein the preemption monitoring indication comprises a one-bit field in downlink control information (DCI) received in the first downlink control channel.

20. The apparatus of claim 15, wherein the uplink transmission comprises a mobile broadband (MBB) transmission and another transmission associated with the preemption indication that comprises a low latency transmission.

21. The apparatus of claim 15, wherein the grant comprises a semi-persistent scheduling (SPS) grant scheduling a sequence of transmissions, and the preemption monitoring indication indicates whether one or more of the sequence of transmissions may be preempted by the preemption indication.

22. A non-transitory computer-readable medium storing code for wireless communication at a user equipment (UE), the code comprising instructions executable by a processor to:

receive a preemption monitoring indication in a grant of resources for an uplink transmission, wherein the grant is received on a first downlink control channel, and the preemption monitoring indication indicates whether the uplink transmission is permitted to be preempted by a preemption indication received on a second downlink control channel and wherein the preemption monitoring indication is indicative of a priority associated with the uplink transmission;

monitor the second downlink control channel for the preemption indication; and cancel the uplink transmission based at least in part on the preemption monitoring indication and a result of the monitoring.

23. The non-transitory computer-readable medium of claim 22, wherein the instructions are further executable by the processor to:
receive radio resource control (RRC) signaling that configures the UE to monitor the first downlink control channel for the preemption monitoring indication.

24. The non-transitory computer-readable medium of claim 22, wherein the instructions are further executable by the processor to:
monitor the second downlink control channel for the preemption indication based at least in part on the preemption monitoring indication indicating that the UE is to monitor the second downlink control channel for the preemption indication, wherein the uplink transmission is allowed to be preempted by another transmission.

25. The non-transitory computer-readable medium of claim 22, wherein the preemption monitoring indication is based at least in part on channel conditions or traffic conditions, an amount of downlink control information (DCI) received by the UE and a decoding budget at the UE, or a combination thereof.

26. The non-transitory computer-readable medium of claim 22, wherein the preemption monitoring indication comprises a one-bit field in downlink control information (DCI) received in the first downlink control channel.

27. The non-transitory computer-readable medium of claim 22, wherein the uplink transmission comprises a mobile broadband (MBB) transmission and another transmission associated with the preemption indication that comprises a low latency transmission.

28. The non-transitory computer-readable medium of claim 22, wherein the grant comprises a semi-persistent scheduling (SPS) grant scheduling a sequence of transmissions, and the preemption monitoring indication indicates whether one or more of the sequence of transmissions may be preempted by the preemption indication.

* * * * *